US011521454B1

(12) United States Patent
Terzini

(10) Patent No.: US 11,521,454 B1
(45) Date of Patent: Dec. 6, 2022

(54) PRODUCT DISPENSING, VALIDATION, LABELING, AND PACKAGING SYSTEM

(71) Applicant: Tension International, Inc., Kansas City, MO (US)

(72) Inventor: Robert Terzini, Corinth, TX (US)

(73) Assignee: Tension International, Inc., Kansas City, MO (US)

( * ) Notice: Subject to any disclaimer, the term of this patent is extended or adjusted under 35 U.S.C. 154(b) by 317 days.

(21) Appl. No.: 16/839,904

(22) Filed: Apr. 3, 2020

Related U.S. Application Data

(60) Provisional application No. 62/829,385, filed on Apr. 4, 2019.

(51) Int. Cl.
| | |
|---|---|
| *G07F 11/16* | (2006.01) |
| *G07F 11/58* | (2006.01) |
| *G06Q 10/08* | (2012.01) |
| *G07F 17/00* | (2006.01) |
| *G07F 11/00* | (2006.01) |

(52) U.S. Cl.
CPC ........... *G07F 11/16* (2013.01); *G06Q 10/087* (2013.01); *G07F 11/005* (2013.01); *G07F 11/58* (2013.01); *G07F 17/0092* (2013.01)

(58) Field of Classification Search
USPC .......................................... 221/253–256, 263
See application file for complete search history.

(56) References Cited

U.S. PATENT DOCUMENTS

| | | | |
|---|---|---|---|
| 7,565,964 B2 * | 7/2009 | Reuteler ............. | B31B 50/0044 198/732 |
| 7,918,402 B2 | 4/2011 | Conlon et al. | |
| 8,392,020 B2 | 3/2013 | Terzini | |
| 8,511,478 B2 | 8/2013 | Terzini | |
| 8,678,232 B2 * | 3/2014 | Mockus ................. | G07F 11/26 221/217 |
| 8,734,061 B2 | 5/2014 | Terzini | |
| 8,745,961 B2 | 6/2014 | Terzini | |
| 8,875,865 B2 | 11/2014 | Terzini | |
| 8,973,338 B2 | 3/2015 | Terzini | |
| 9,037,291 B2 | 5/2015 | Terzini | |
| 9,483,897 B2 | 11/2016 | Terzini | |
| 9,665,688 B2 | 5/2017 | Terzini et al. | |
| 9,697,669 B2 | 7/2017 | Terzini | |
| 9,844,846 B2 | 12/2017 | Terzini | |

(Continued)

*Primary Examiner* — Gene O Crawford
*Assistant Examiner* — Ayodeji T Ojofeitimi
(74) *Attorney, Agent, or Firm* — Avek IP, LLC; Aaron S. Reed

(57) ABSTRACT

A product dispensing system and methods of use are described. The system includes a linear dispensing unit configured to hold a number of products in an equal number of respective channels in a stacked orientation. Single units of the products are dispensed onto dedicated carriers which maintain an orientation of the product units. The carriers are independently moveable and identifiable and are moved to aggregate various product units associated with a single order and to transport the product units to a validation system. The validation system uses a variety of sensors to verify the identity of the product unit and to cross-reference the product identity with the order. A label is applied to the product unit and the product unit is further transported to a packaging system while continuing to maintain an orientation thereof.

20 Claims, 20 Drawing Sheets

(56) References Cited

U.S. PATENT DOCUMENTS

| | | |
|---|---|---|
| 10,669,098 B1 | 6/2020 | Terzini et al. |
| 11,345,547 B1 | 5/2022 | Terzini et al. |
| 2011/0146835 A1 | 6/2011 | Terzini |
| 2014/0250829 A1 | 9/2014 | Terzini |
| 2015/0158611 A1* | 6/2015 | Kalany ............... B65G 47/26 53/531 |

* cited by examiner

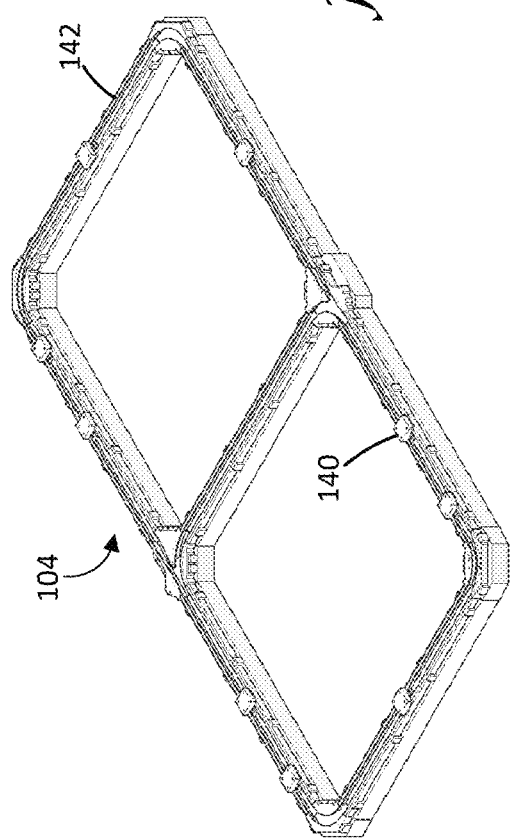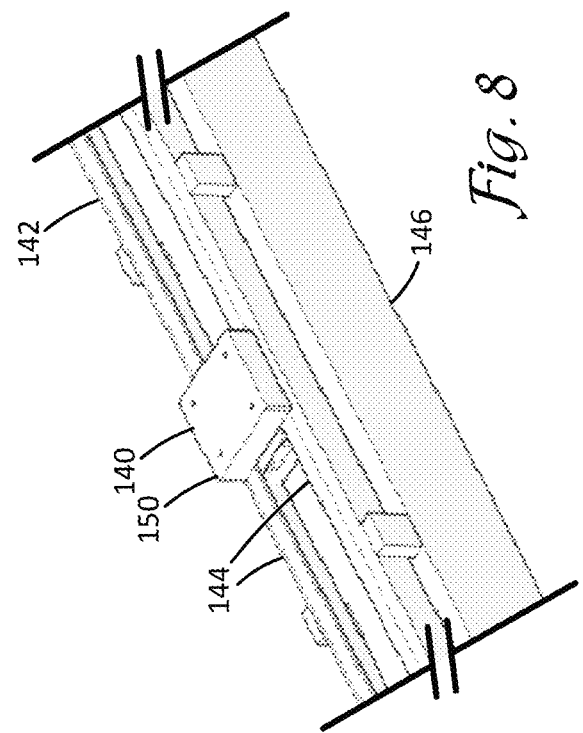

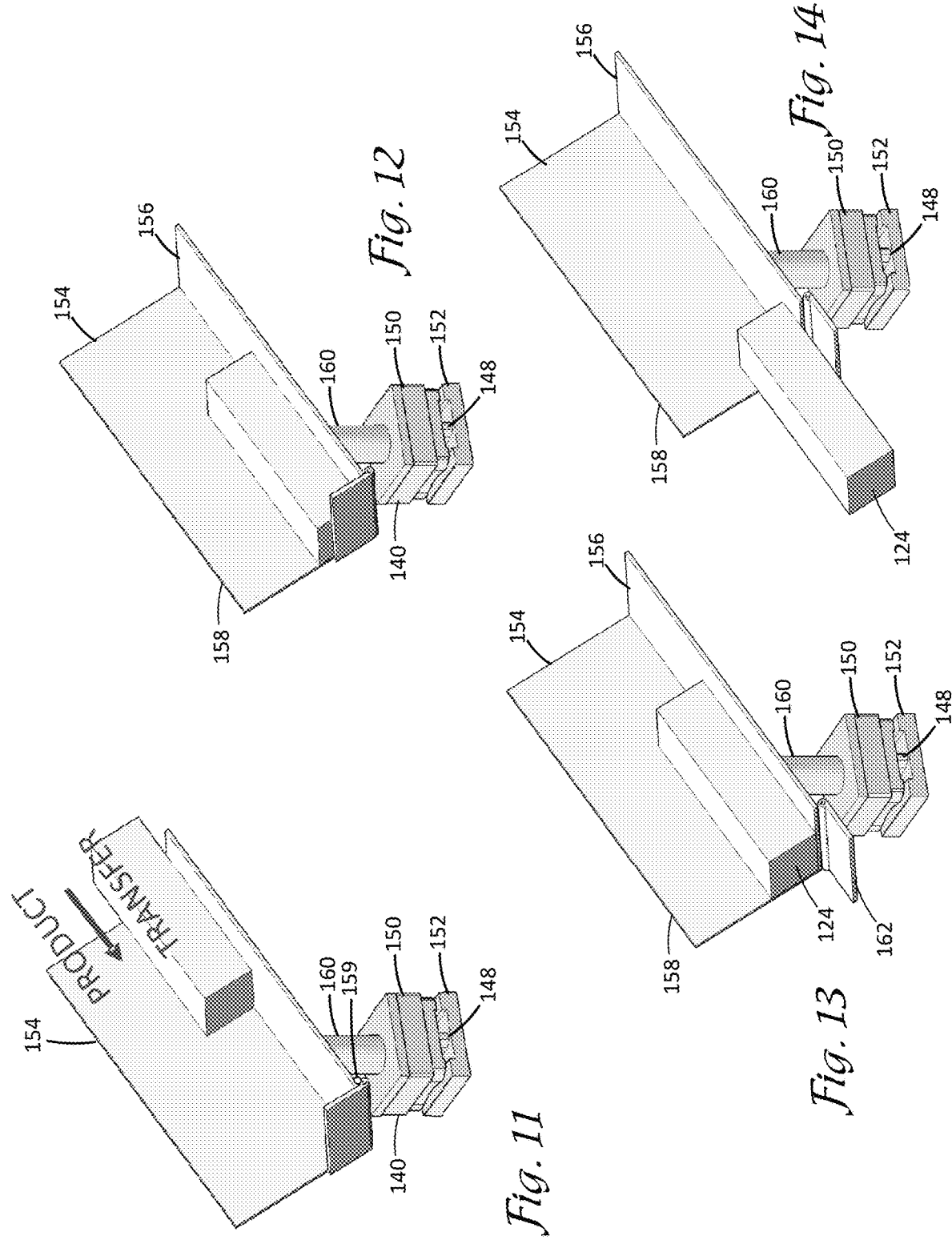

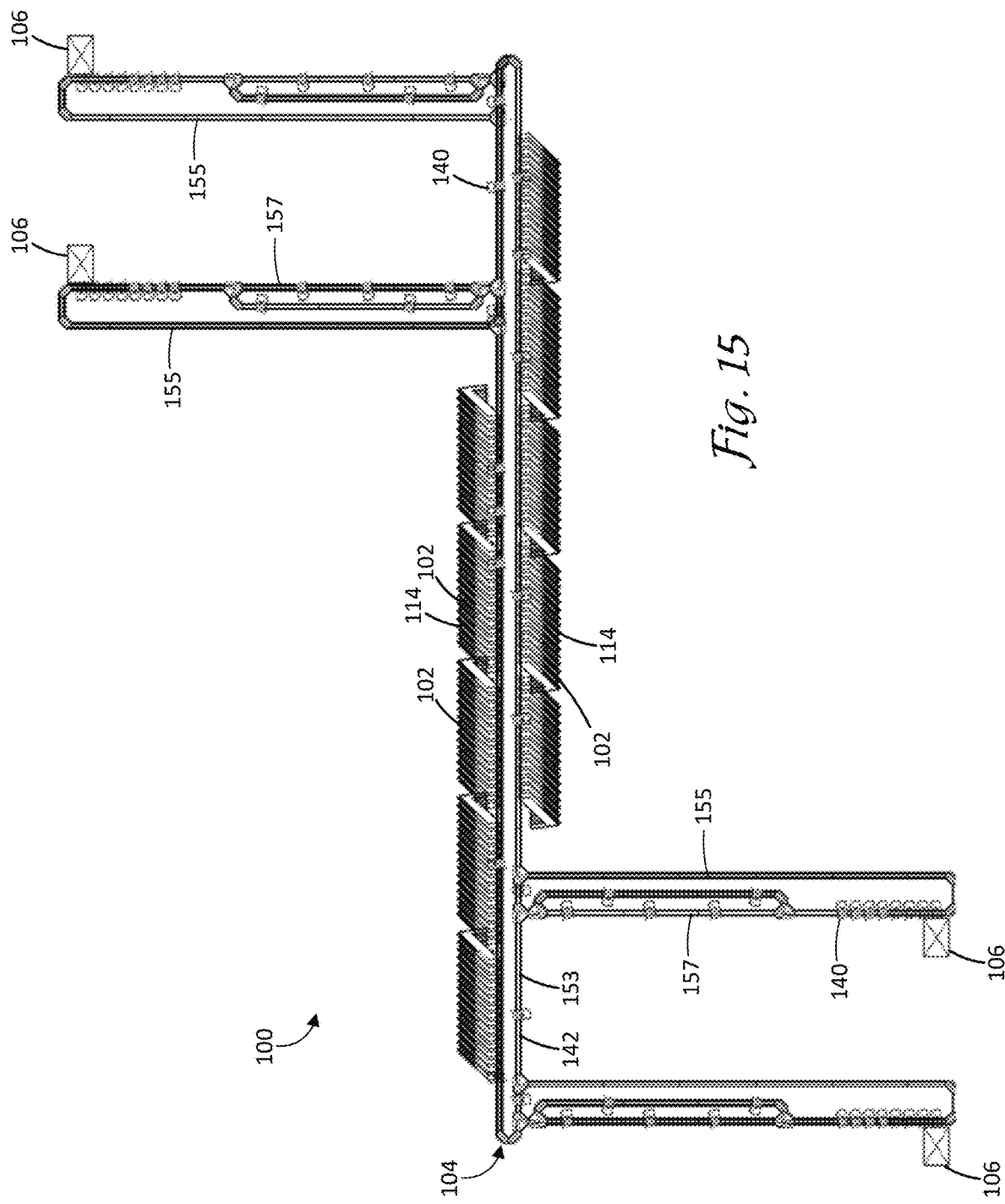

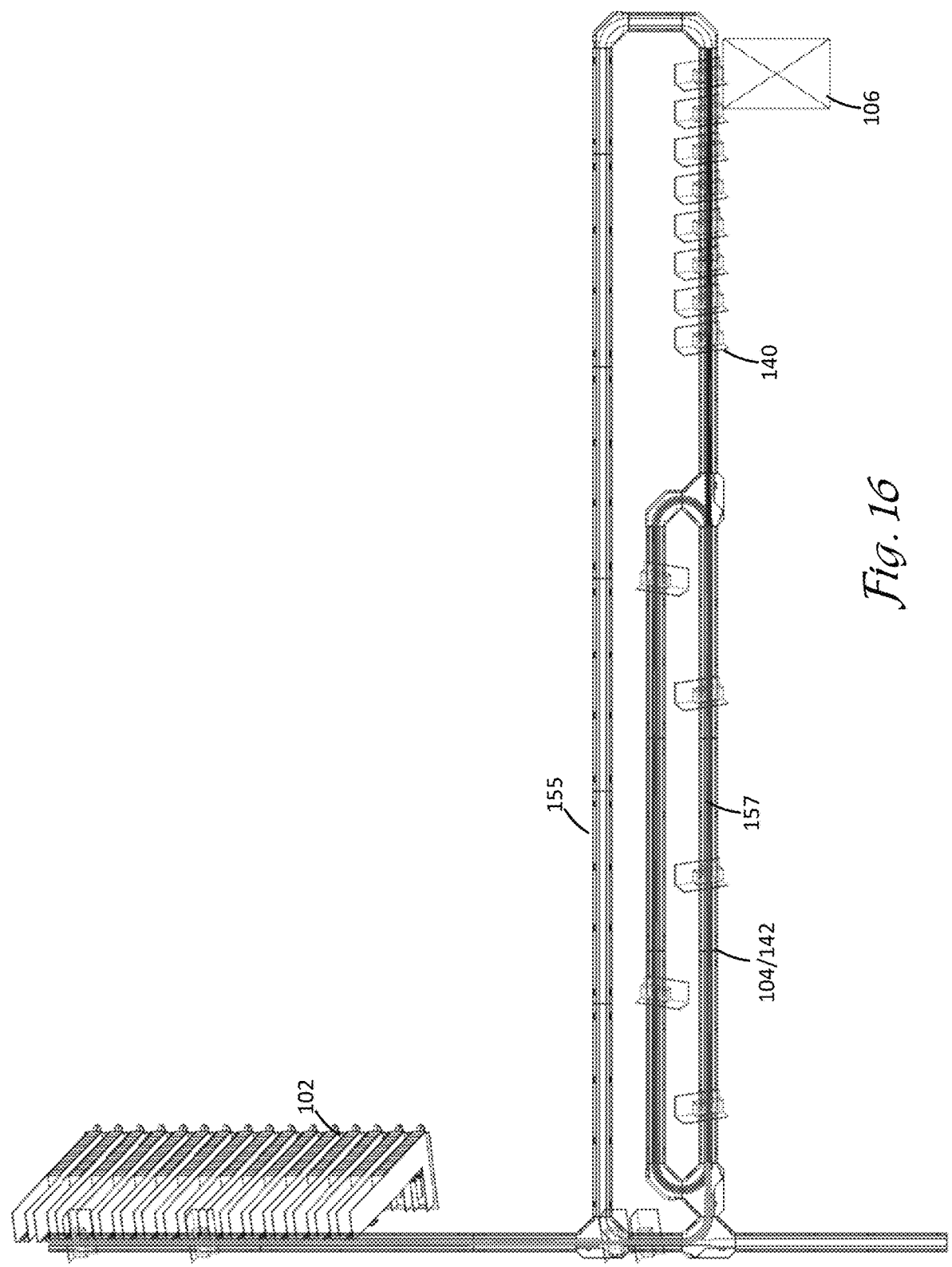

PRODUCT DISPENSING, VALIDATION, LABELING, AND PACKAGING SYSTEM

CROSS-REFERENCE TO RELATED APPLICATIONS

This application claims the benefit of U.S. Provisional Patent Application No. 62/829,385 filed Apr. 4, 2019, the disclosure of which is hereby incorporated herein in its entirety by reference.

BACKGROUND

Material handling systems enable businesses that maintain an inventory of stored products to distribute products from the inventory based on customer orders. Automated distribution of stored products requires product verification in order to avoid distribution of the wrong product, or failure to distribute a product at all. In some industries, such as pharmaceutical distribution and the like, individual product labeling may also be required prior to distribution. The stored product inventory may include products of many types, sizes and shapes which may be maintained in storage at a warehouse facility, at a retail outlet, or other location. Pharmacies, for example, such as high-volume mail order/central-fill, specialty, and acute and long-term care facility-based pharmacies, dispense a wide variety of stored products from inventory to large numbers of patients. The pharmaceutical products are stored at an inventory location where a pharmacist or technician individually selects products from the inventory for dispensing. Pharmaceutical product dispensing includes labeling the selected product with the patient's information and dosing instructions or usage directions as well as verifying the accuracy of the labeled product.

The prior art describes various attempts to automate the above-described process by providing automated systems for pulling numerous products from inventory and then transporting the products away from the inventory for dispensing. Some of the prior art automated systems rely on elaborate mechanisms to pull the product from inventory. The automated systems often utilize a vehicle on a conveyor to carry the mechanism, along with the product, away from the inventory for labeling. An example of a conveyor frequently used is an endless conveyor. The vehicles on an endless conveyor move in direct relation to the other vehicles. That is, the vehicles do not have independent coordinated movement. Therefore, any given vehicle is dependent upon the movement of the conveyor as well as the other vehicles when it pulls products from the inventory. This dependent movement inhibits the ability of the system to pull different products from different inventory locations and especially limits the ability to simultaneously pull products from more than one inventory location. This dependent movement also decreases efficiency and increases the amount of space necessary for operation of the system.

The automated systems in the prior art also add unnecessary steps and machinery between the steps of obtaining the product and labeling it. In particular, after delivering the product to the conveyor, the conveyor transports the product toward a labeler which must orient the product using sensors to ensure that the label is applied correctly. In other words, previous automated systems obtain and transport the product without regard to an orientation needed to correctly apply the label, thereby necessitating an extra step in the process to reorient the product before application of a label.

Prior art systems select only identically shaped products for transport to a labeler. Product sensors at the labeler station are designed to handle and verify only products of the selected shape. Separate labeling and verification stations equipped with shape-specific equipment must therefore be provided for flat and round or irregularly shaped products.

Accordingly, there exists a need for an improved inventory product distribution, verification, and labeling system that uses independent, coordinated carriers or dependent carriers for efficient movement in less space, that can maintain the products in a preselected orientation so as to enable labeling of the products without the need for reorientation, and that can select, transport, label and verify the products without regard to shape.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a product dispensing system that maintains an orientation of dispensed product from dispensing through verification, labeling, and packaging and that is configurable for small product lines of less than thirty products to large product lines of greater than one thousand products.

The product dispensing system comprises one or more linear dispensing units, a conveyance system, a validation system, and may include a packaging system. The linear dispensing units each include a plurality of upstanding channels configured to receive a supply of unit-of-use-style product units that are stacked in respective channels in a predetermined orientation to direct identifying indicia in a desired direction. The channels may be disposed on an A-frame structure through which the conveyance system passes. The A-frame structure provides a forward leaning orientation such that product units loaded in the channels are placed on a downward slope toward the conveyance system. The channels may also be oriented to lean or tilt to the side or longitudinally relative to the conveyance system. Each of the channels includes a product ejector configured to eject a single product unit from the channel onto the conveyance system.

The conveyance system preferably comprises a linear synchronous motor technology in which a plurality of pucks or carriers are independently moveable, identifiable, and traceable along a track. Each of the carriers includes a V-block coupled thereon. The V-block comprises a side plate and a base plate joined along a shared edge and oriented generally orthogonally to one another. An actuatable product stop is provided at a trailing end of the V-block to selectively retain a product unit on the V-block. The V-block is oriented to substantially match the forward and sideways lean of the channels such that the orientation of a product unit that is transferred from the channel onto the V-block remains substantially constant and the product unit is naturally automatically aligned and abutted against the side plate and the product stop of the V-block by gravity.

The carriers of the conveyance system are moveable by a controller such as a computer program controller, along a track between the linear dispensing unit and the validation system. The track may include one or more staging loops into which the carriers may be diverted and/or retrieved to enable the controller to appropriately sequence the carriers into a desired order for validation and/or packaging.

The validation system is located along the track of the conveyance system and includes an escapement, a plurality of sensors, and a labeling module. The escapement is configured similarly to the V-block to receive the product unit from the V-block via gravity and to preserve the orientation of the product unit. The sensors, which may include cameras, infrared scanners, radio-frequency identification scanners, or the like, are configured to scan and read the identifying indicia on the product units and may record images of the product unit while the product unit is retained on the escapement. A controller validates the scanned indicia with respect to a selected order and instructs the labeling apparatus to prepare and apply a label associated with the order. Retention of the product unit on the escapement provides a known and constant orientation and position of the product unit relative to the labeling module without need for additional positioning apparatus. The labeling module may thus be configured based on a constant label application location (in at least one plane) across a variety of product units to be labeled independent of the length or width or shape of the product units.

Following validation and labeling by the validation system, the product units may be released from the escapement by actuation of a stop plate on a distal end of the escapement to allow the product units to slide via gravity into a bin, tote, or tub for packaging by hand or other subsequent means. The product units may be selectively released and accumulated in respective tubs associated with a particular order. Alternatively, the product units may be similarly released onto another similarly configured V-block disposed on a second conveyance system associated with the packaging system or retained in their respective V-blocks and transported directly to the packaging system.

The packaging system may comprise a variety of bagging or boxing apparatus configured to receive and accumulate product units associated with a particular order into a single package, verify the product units deposited into the package relative to an order, label the package for shipping, and/or seal the package. The packaging system may also print and deposit any necessary documentation associated with an order or product units included in the order into the package prior to sealing. The sealed package can then be transported by known means to a desired location for shipping.

The product dispensing system is configured for simple scalability by incorporating additional linear dispensing units to accommodate additional product units. The conveyance system is further configurable or expandable to provide additional carriers and/or paths to accommodate additional validation systems, packaging systems, and product dispensing systems as needed to accommodate the volume of product units handled by the system. For example, one or more manual dispensing stations may be provided in which operators manually retrieve a product unit from a storage location and place the product unit on a carrier for handling by the system. In doing so, the operator also scans identifying indicia on the product unit and on the selected carrier to marry the product unit with the carrier. Because each carrier is loaded with a known product unit that is married to the carrier and the carrier is identifiable and independently moveable by the control system, manually populated carriers may be easily intermixed and aggregated with automatically populated carriers within the product dispensing system.

Additionally, the system may be configured to receive non-unit-of-use products, such as vials of oral solids, solutions, or liquids that are filled as needed. These products may be disposed on and associated with a respective carrier and transported through the system similarly to the manually and automatically dispensed unit-of-use product units.

DESCRIPTION OF THE DRAWINGS

Illustrative embodiments are described in detail below with reference to the attached drawing figures, and wherein:

FIG. 7 is a perspective view of a linear conveyance system with independently controllable carriers disposed thereon and depicted in accordance with an exemplary embodiment;

FIG. 8 is an enlarged perspective view of the linear conveyance system of FIG. 7;

FIGS. 11-14 are perspective views of a carrier depicting a sequence of receiving, transporting, and depositing a product while maintaining an orientation of the product in accordance with an exemplary embodiment;

FIG. 15 is a top plan view of a linear dispensing system depicted in accordance with an exemplary embodiment;

FIG. 16 is a partial top plan view of a linear dispensing system depicting a dispensing module, a linear conveyance system with a staging loop, and an escapement depicted in accordance with an exemplary embodiment;

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

Figure 23:
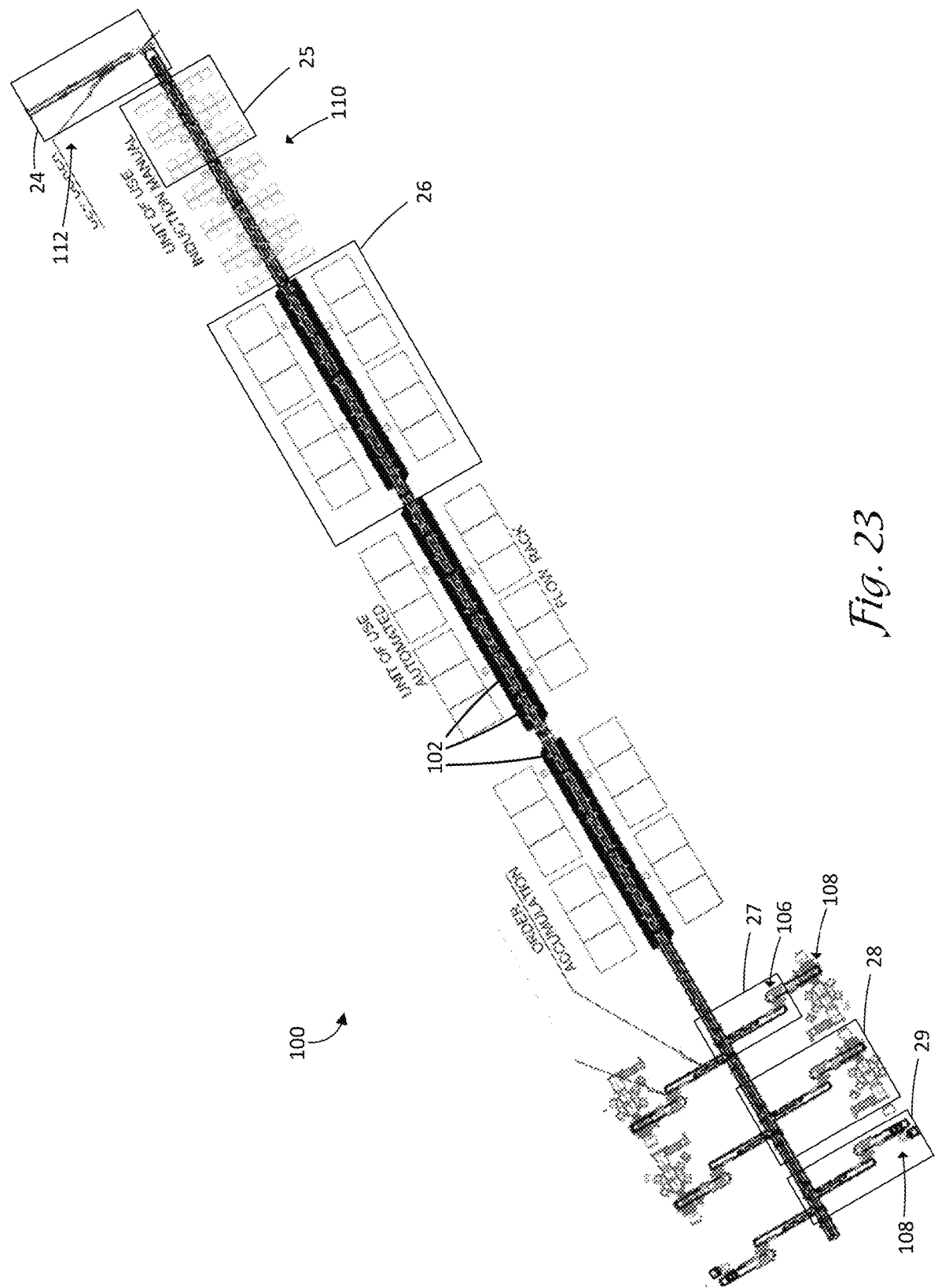
FIG. 23 is a top plan view of a linear dispensing system depicted in accordance with another exemplary embodiment.

With initial reference to FIG. 23 a product dispensing system 100 is described in accordance with an exemplary embodiment. Aspects of exemplary embodiments described herein build on and improve upon features of prior works of the inventor including those disclosed in U.S. Pat. Nos. 8,875,865 and 9,483,897 both to Terzini. The disclosures of each of which are hereby incorporated herein in their entirety by reference. The system 100 is described herein with respect to an application in which prescription and over-the-counter pharmaceuticals are dispensed however such is not intended to limit applications of the system 100.

The product dispensing system 100 comprises one or more linear dispensing units 102, a conveyance system 104, and a validation system 106. The system 100 may also include or incorporate a packaging system 108, a manual product placement station 110, and a non-unit-of-use induction system 112, among other product placement stations. The linear dispensing system 102 and other components of the system 100 are shown and described herein with respect to unit-of-use products. Unit-of-use products include those that are provided in a consumer-ready form. In many instances, unit-of-use products include one or more items that have been placed inside a container such as a carton or box that is labeled for commercial sale. For example, prescription or over-the-counter medications may be provided in one or more blister-packs that are inserted into a box that is labeled with identifying indicia on one or more sides thereof. The identifying indicia may include any information associated with the product such as a name, usage information, promotional information, barcodes, QR codes, production lot numbers, expiration dates, nutritional information, and drug codes among other information that may be desired by a manufacturer or required by law.

Non-unit-of-use products comprise products that must be packaged prior to induction into the conveyance system 104 of the product dispensing system 100. Such products may include, for example in the instance of pharmaceutical products, oral solids, solutions, or other medicinal liquids, gels, suspensions, or the like that are dispensed from bulk containers into vials or similar containers as needed.

Both unit-of-use and non-unit-of-use products may be provided and handled by the system 100 in a variety of forms. Such forms are typically referred to as flats, rounds, and irregular shapes. Flats include product units that are provided in a cuboidal box, carton, or similar form. Rounds include product units that are generally cylindrical in form and irregular shapes comprise all other product units.

Although not shown in FIG. 23, the product dispensing system 100 is preferably provided with one or more computing devices or controllers in electrical communication with the linear dispensing units 102, the conveyance system 104, the validation system 106, and the packaging system 108, either through wired or wireless communication. An exemplary computing device 10 that may be employed as a controller in the system 100 is described below with reference to FIG. 30. The controller may track inventories of products before entering the system 100 as well as locations of individual product units upon entry into the system 100 and at all points through to dispensing of the product units from the system 100. It is understood that the controllers may be further linked to additional systems to track the product units prior to entry into the system 100 and after dispensing from the system 100 through shipping and receipt by a consumer to provide a full lifecycle record of the product units, however such is beyond the scope of the description provided herein.

Figure 5:
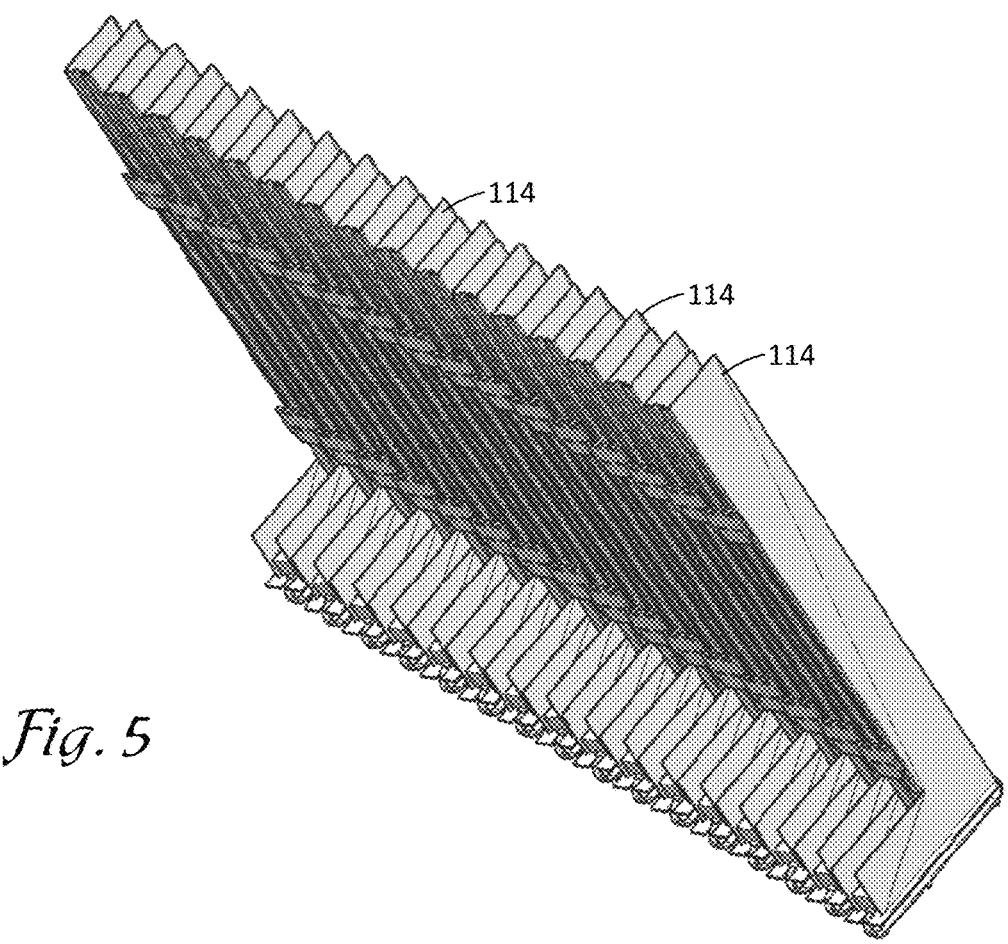
FIG. 5 is a perspective view of a set of channels of a linear dispensing unit with the channels oriented at forward- and a side-leaning angles in accordance with an exemplary embodiment.

With reference now to FIGS. 1-5, the linear dispensing unit 102 is described in accordance with an exemplary embodiment. The linear dispensing unit 102 includes a plurality of channels 114 disposed parallel to one another, side-by-side in a row as best shown by FIG. 5. The channels 114 may be incorporated into sets having any number of channels 114, but preferably the sets include between about ten and about thirty channels 114 or more preferably about sixteen channels 114. As such, the sets may be used individually in smaller applications having only a few products (i.e. sixteen or less products) to be dispensed thereby or combined to expand the system 100 to larger applications having capacity for up to thirty-two, sixty-four, or multiples thereof up to or greater than one thousand products.

Each channel 114 includes a pair of sidewalls 116, a guide member 118, a bottom wall 120, and an ejector 122. The sidewalls 116 comprise planar, L-shaped members that are aligned parallel to one another and spaced apart a sufficient distance to receive a product unit 124 of a unit-of-use product therebetween. First portions 125 of the L-shape of the sidewalls 116 form a generally upstanding column within which a plurality of product units 124 can be generally vertically stacked. Second portions 127 of the sidewalls extend generally horizontally to define a chute or exit pathway 129 through which the product units 124 exit the channel 114 as described more fully below.

The sidewalls 116 may each include a front flange 126 along at least a portion of a forward edge of the first portions 125 thereof that extends from the forward edge of the sidewall 116 at an angle toward the front flange 126 of the opposite sidewall 116. As such, the front flanges 126 define a forward wall of the upstanding column of the channel 114 against which a forward face of the product units 124 may be disposed.

Mounting and adjustment plates 128 are coupled to the front flanges 126 of the sidewalls 116. The plates 128 are configured to maintain and allow adjustment of a spacing between the sidewalls 116 to accommodate product units 124 of varied widths. The plates 128 may include features such as slotted apertures through which fasteners may be disposed to couple to the respective sidewalls 116. Spacing between the sidewalls 116 may thus be adjusted by moving the fasteners within the slotted apertures and tightening the fasteners to maintain a desired position of the sidewall 116. The plates 128 are also configured to engage a frame of a support structure 130 on which the channels 114 are disposed as described more fully below. The plates 128 may further aid to maintain a spacing between adjacent channels 114 as well as a vertical location of the channel 114 on the structure 130.

The guide member 118 comprises an L-shaped member having a first leg 132 and a second leg 134 that extend generally perpendicularly to one another. The first leg 132 is adjustably coupled along the forward face of the channel 114. The second leg 134 is disposed between and extends parallel to the second portions 127 of the sidewalls 116 to form a top wall of the exit pathway 129. The coupling of the first leg 132 along the forward face of the channel 114 is adjustable to adjust a position of the second leg 134 to accommodate product units 124 of varied height dimensions.

The bottom wall 120 is disposed along lower edges of the second portions 127 of the sidewalls 116 to form a bottom surface of the channel 114 atop which the product units 124 may rest. The bottom wall 120 also forms the bottom surface of the exit pathway 129 along which the product units 124 may slide when exiting the channel 114. As depicted in FIGS. 1-4, the bottom wall 120 is bifurcated by the ejector 122 which includes a belt 136 disposed between portions of the bottom wall 120.

The ejector 122 comprises a conveyor belt or timing belt apparatus integrated with the channel 114. The belt 136 may include strikers 138 or teeth that extend from the belt surface at spaced apart intervals. Operation of the ejector 122 moves the belt 136 along the bottom wall 120 toward a distal end thereof. A motor or other actuator (not shown) may be provided and configured to move the belt 136 in a stepwise fashion to dispense the product units 124 from the channel 114.

A striker 138 may contact a rearward side of a product unit 124 to slidably move the product unit 124 along the exit pathway 129. Movement of the product unit 124 may also be aided by gravity. A striker 138 positioned along a forward side of the product unit 124 may also aid to retain the product unit 124 against movement past the distal end of the exit pathway 129 and against gravity-aided movement until dispensing of the product unit 124 is desired.

Figure 9:
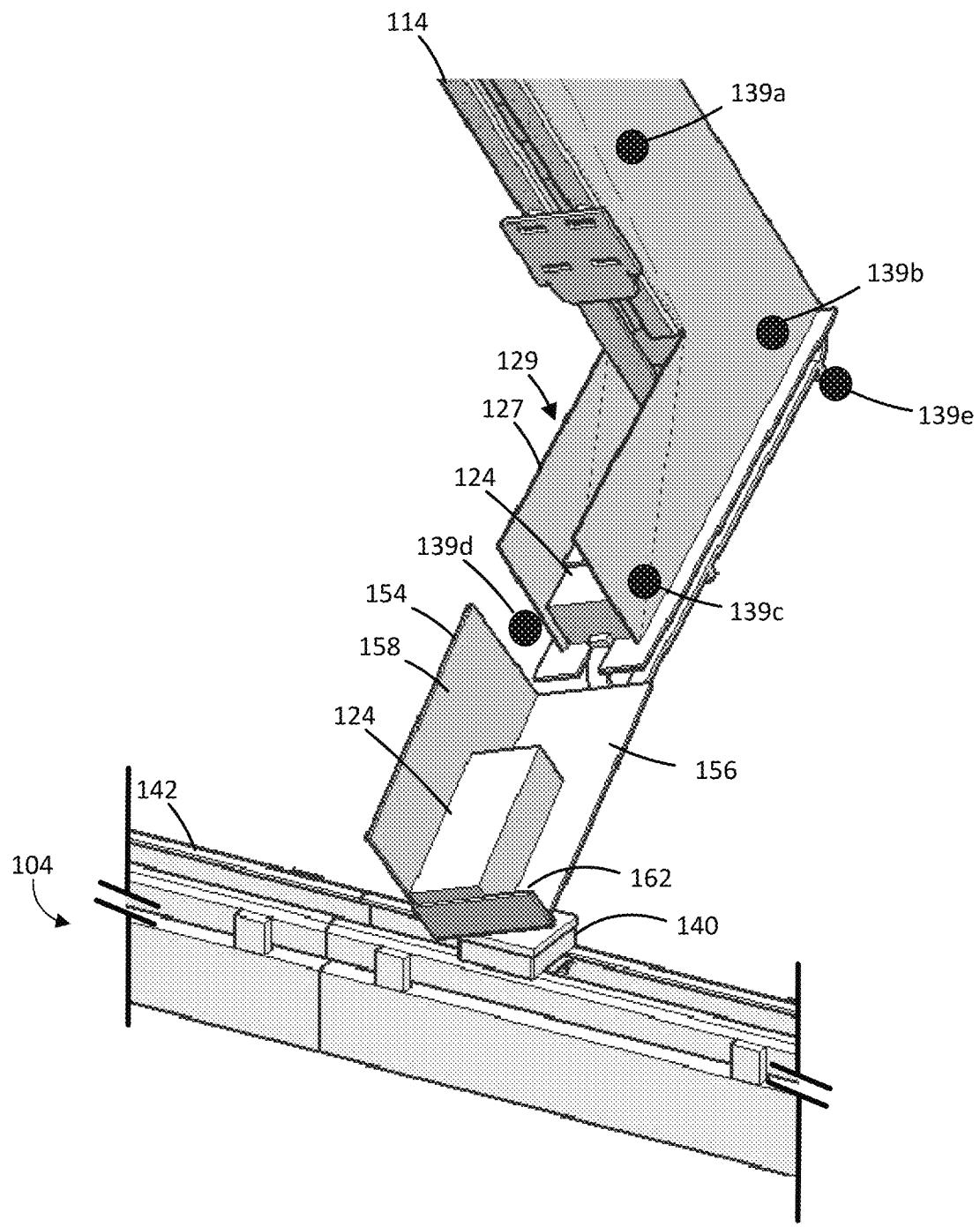
FIG. 9 is a perspective view of a single product channel, a carrier, and a linear conveyance system depicted in accordance with an exemplary embodiment.
Figure 10:
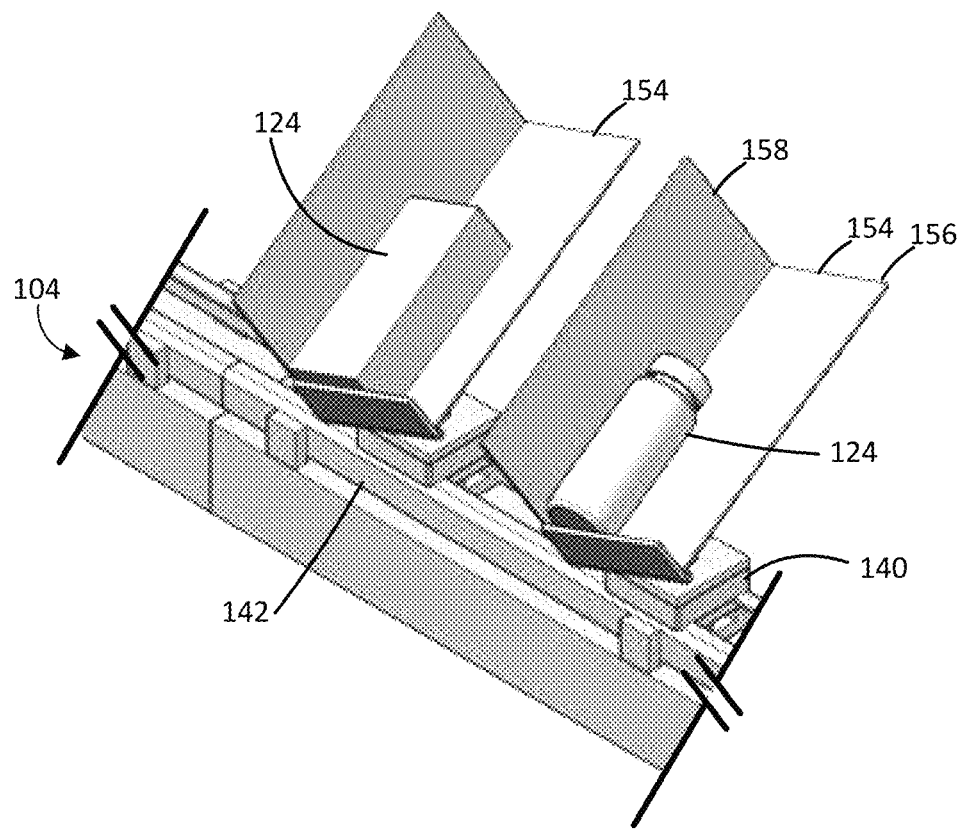
FIG. 10 is a perspective view of a pair of identical carriers with one of the carriers having a flat product unit disposed thereon and the other carrier having a round product unit disposed thereon depicted in accordance with an exemplary embodiment.

The channels 114 may include a plurality of sensors configured to detect the presence of product units 124 disposed therein and as they are dispensed. For example, as depicted in FIG. 9, the channels 114 may include a low inventory sensor 139a, a channel-empty sensor 139b, a product-ready-to-dispense sensor 139c, a product-dispensed sensor 139d, and a striker-home sensor 139e. The inventory low sensor 139a detects the absence of product units 124 at a lower location within the channel 114 which indicates that only a small number of product units 124 remain in the channel 114. The channel-empty sensor 139b detects the absence of a product unit 124 at a lowest location in the channel 114 indicating that the channel 114 is empty. The product-ready-to-dispense sensor 139c detects the presence of a product unit 124 near a distal end of the exit pathway 129 of the channel 114 indicating that the channel 114 is ready to dispense the product unit 124 when needed. The product-dispensed sensor 139d detects the product unit 124 as it passes the sensor 139d during dispensing and/or the absence of the product unit 124 after it passes by the sensor 139d which indicates that the product unit 124 was dispensed successfully. The striker-home sensor 139e detects the presence of a striker 138 which indicates that the belt 136 has completed a desired movement extent.

Sets of the channels 114 are mounted on the support structure 130. In some embodiments, adjacent channels 114 may share sidewalls 116 disposed therebetween. Each of the channels 114 is preferably oriented at an angle with respect to two different axis or planes. First, the channels 114 are tilted forward to place the second portions 127 of the sidewalls 116 and the bottom wall 120 at a downwardly extending angle between about 5° and about 35° or between about 15° and about 25° or about 20°. The channels 114 are also tilted side-to-side toward one of the sidewalls 116 (or longitudinally relative to the length of the conveyance system) at an angle between about 5° and about 35° or between about 15° and about 25° or about 20°. As such, a downward force of gravity on each of the product units 124 stacked within the channel 114 is at least partially directed into the respective sidewall 116. Such an arrangement reduces the cumulative load placed on a bottom most product unit 124 in the channel 114 which may aid to avoid crushing of the bottom most product unit 124. This arrangement also increases a maximum length of the first portion 125 of the channel 114 and thus a maximum number of product units 124 that can be disposed therein without increasing an overall height of the linear dispensing unit 102.

Figure 6:
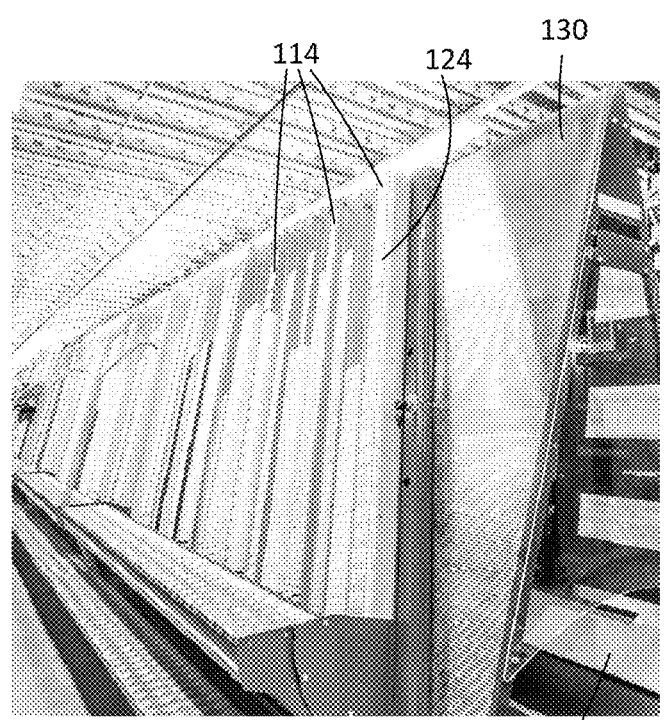
FIG. 6 is an illustrative view of a dispensing system having an A-frame configuration in which a plurality of product channels therein are disposed at forward-leaning and side-leaning angles and with a linear conveyance system extending through the A-frame configuration depicted in accordance with an exemplary embodiment.

As depicted in FIG. 6, the support structure 130 preferably comprises an A-frame-style structure however other structures may be employed. The channels 114 may be disposed on the support structure 130 with their second portions 127 being directed inward toward and into the structure 130 by hooking the plates 128 onto a frame member (not shown) of the support structure 130 and/or by fastening the plates 128 to the frame member. The A-frame form of the structure 130 provides the desired forward tilt or lean to the channel orientation. Tilting of the channels 114 toward one end of the A-frame structure 130 provides the desired side-to-side tilt or lean. Additional sets of the channels 114 may be disposed on an opposite side of the A-frame structure 130, or structures forming only a half of an A-frame or similar one-sided structure may be provided where only a single set of channels 114 is desired on the structure 130.

With reference now to FIGS. 7-14, the conveyance system 104 is described in accordance with an exemplary embodiment. The conveyance system 104 preferably comprises a linear synchronous motor or actuator that employs a linear magnetic induction system to move a plurality of independent carriers 140 along one or more tracks 142. One exemplary linear synchronous motor system that can be employed is the MAGNEMOTION® system from Magnemotion, Inc. of Devens, Mass. which is a division of Rockwell Automation, Inc. of Milwaukee, Wis. Other actuators and conveyance systems may also be employed. For example, a linear timing belt and stepper motor, a linear electric actuator, or a pneumatic rodless actuator might be employed without departing from the scope of exemplary embodiments.

As depicted in FIGS. 7 and 8, the track 142 of the conveyance system 104 includes a pair of parallel rails 144 on a top portion thereof and extending along its length. A base portion 146 is provided beneath the rails 144 and houses a plurality of electromagnets (not shown) aligned sequentially along the length of the track 142. The carrier 140 includes a pedestal 148 that extends vertically between the rails 144 with a carrier plate 150 coupled to a top end and a permanent magnet 152 disposed at a bottom end thereof, as best depicted in FIGS. 11-14. The pedestal 148 and/or the rails 144 may include rollers, bearings, or low-friction guides to aid sliding movement of the carrier 140 along and between the rails 144.

Propulsion of the carrier 140 along the track 142 is provided by a controller, such as the computing device 10, sequentially energizing the electromagnets in the base portion 146 to attract and/or repel the permanent magnet 152 of the carrier 140. Each carrier 140 is thus moveable independently of all other carriers 140 along the track 142 and at variable speeds. The location and identity of each carrier 140 is also independently trackable by the controller.

The path or layout of the track 142 may take any desired form to fit a particular application. In one embodiment depicted in FIGS. 15 and 16, the track 142 is disposed to pass between opposing or oppositely oriented linear dispensing units 102 or sets of the channels 114 in an elongate loop 153 and with a plurality of exit paths 155 that lead to the validation system 106. In embodiments that employ A-frame-style support structures 130, the track 142 may pass through the A-frame structure 130. The exit paths 155 may include one or more staging loops 157 along which the carriers 140 may be directed by the controller to order the carriers 140 in a desired sequence before moving the carriers 140 to the validation system 106 for operation thereon as described more fully below.

With reference to FIGS. 9-14, a V-block 154 is coupled to each carrier 140 atop each respective pedestal 148. The V-block 154 includes a base plate 156 and a side plate 158 that are joined along a common edge generally orthogonally to one another. The base plate 156 is spaced above the carrier plate 150 by a pier 160 and is supported in an orientation that substantially matches that of the bottom wall 120 of the channels 114, e.g. with a downward slope and an side-to-side slope in a longitudinal or upstream/downstream direction relative to the conveyance system. The side plate 158 is thus also oriented in a position that substantially matches that of the sidewalls 116 of the channels 114. As such, a product unit 124 that is dispensed from the channel 114 slides from the bottom wall 120 of the channel 114 and onto the base plate 156 of the V-block 154 while the orientation of the product unit 124 is substantially maintained. The product unit 124 is further urged via gravity and the sideways tilt of the V-block 154 into abutment with the side plate 158 as depicted in FIGS. 9-14. In instances in which the product unit 124 comprises a "round" (see for example, FIG. 10), the product unit 124 may roll about an axis of the "round" instead of or in addition to sliding toward the side plate 158. The product unit 124, whether it be a flat, round, or irregular shape is thus automatically aligned against the side plate 158 and the product stop 162 by gravity.

The gravitational bias on the product unit 124 toward the side plate 158 and the product stop 162 may also aid to retain the product unit 124 in position as the carrier 140 is moved along the track 142 which movements may be performed at relatively high rates of speed and/or accelerations/decelerations along both straight and curved sections of the track 142. This configuration of the V-block 154 thus operates to maintain orientation and retention of the product unit 124 in the V-block 154 without regard to the shape of the product unit 124 in contrast to known systems that require unique carrier configurations for each product form to be handled, additional apparatus for orienting and/or positioning product units on carriers, and/or fail to maintain product orientation during handling and transport thereof.

A pivotable product stop 162 is provided at lowermost end of the base plate 156. The product stop 162 is biased by, for example, a spring 159 to extend upwardly from the base plate 156 a sufficient distance to obstruct sliding movement of a product unit 124 along the base plate 156, as depicted in FIGS. 11 and 12. The product stop 162 may be pivotable downward and away from the base plate 156 to allow the product unit 124 to slide via gravity along and off of the V-block 154, as depicted in FIGS. 13-14. The product stop 162 may be pivoted by an actuator (not shown) that is disposed on a separate component, such as a component of the validation system 106 or the packaging system 108. The actuator may comprise, for example, a pneumatic, electric, or hydraulic cylinder that extends a piston into contact with a portion of the product stop 162 to pivot the stop 162. Upon retraction of the piston the product stop 162 is again biased toward its previous upstanding position via, for example by a spring (not shown). The actuator is preferably not included or provided on the V-block 154 or the carrier 140 to reduce complexity of the carrier 140 as well as the weight of the carrier 140.

Figure 15A:
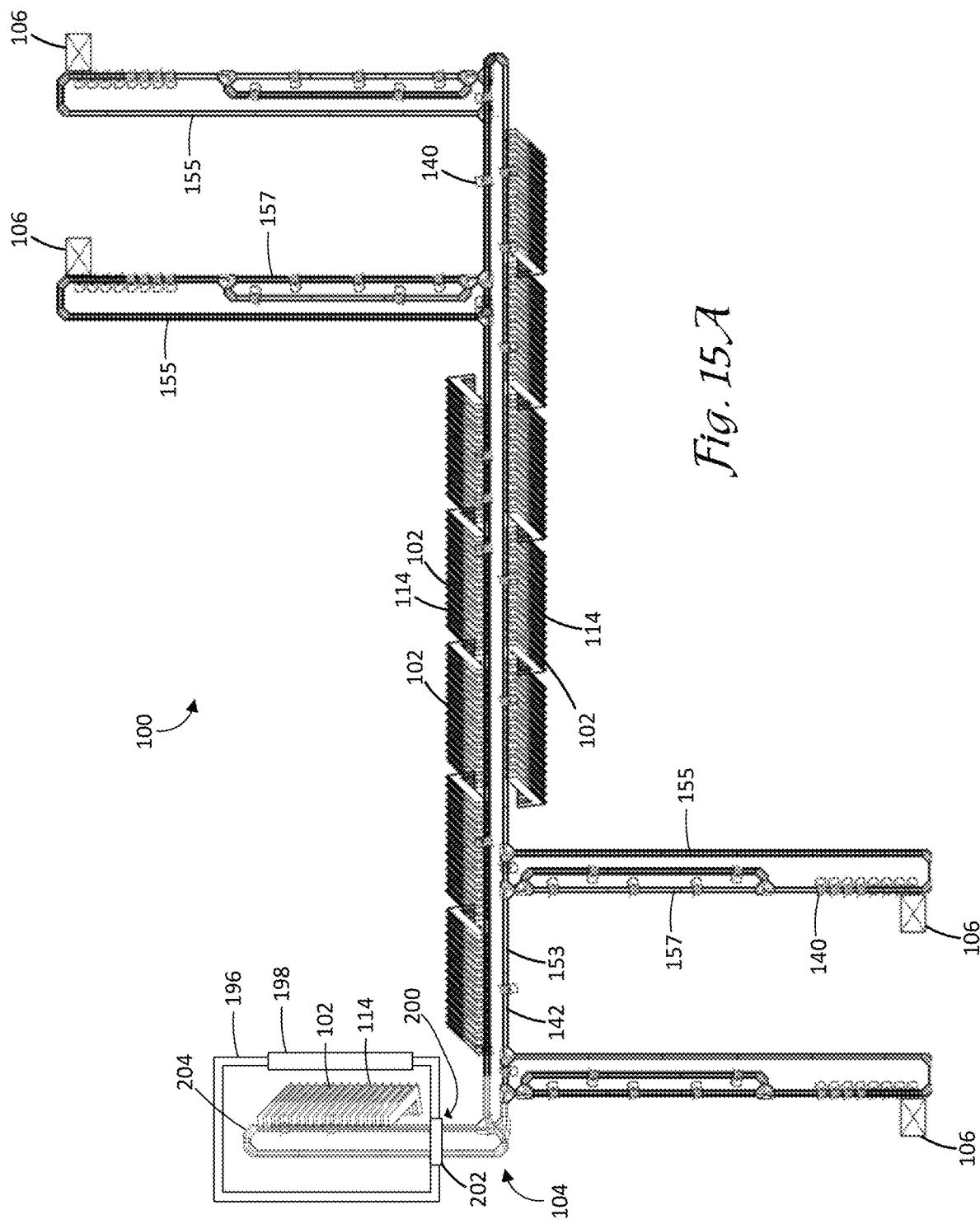
FIG. 15A is a partial top plan view of a linear dispensing system that includes a linear dispensing unit disposed within a refrigeration unit for dispensing refrigerated product units depicted in accordance with an exemplary embodiment.
Figure 17:
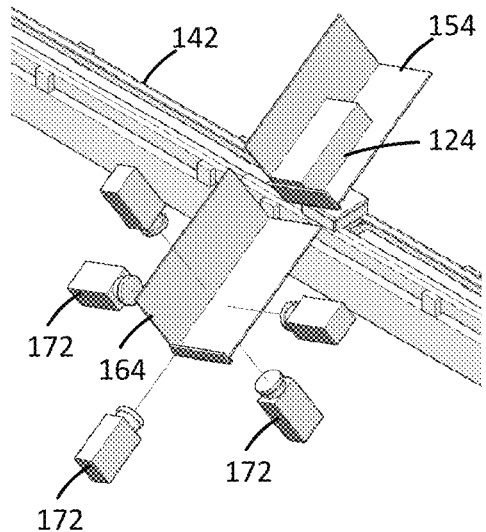
FIGS. 17-20 are perspective views depicting transfer of a product unit from a carrier to an escapement and validation of the product unit in accordance with an exemplary embodiment.
Figure 18:
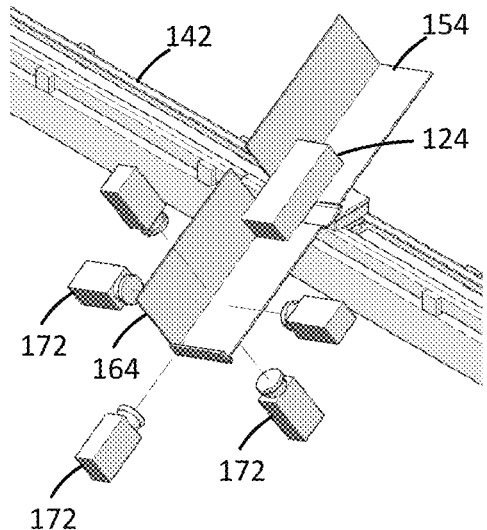
Figure 19:
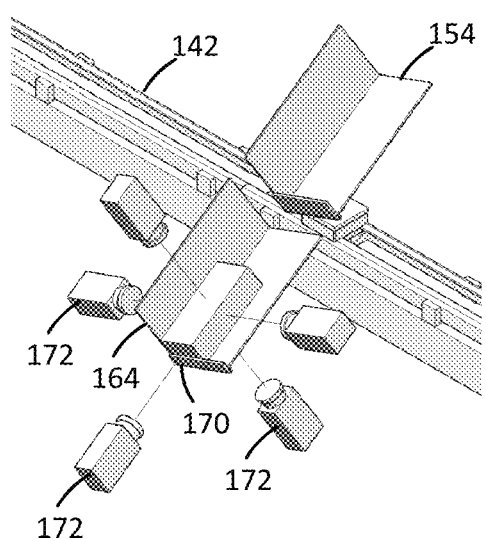

In one embodiment depicted in FIG. 15A, one or more of the linear dispensing units 102 and their support structures 130 may be disposed within a refrigeration unit 196. The refrigeration unit 196 comprises a chilled or cooled enclosure having an access door 198 or panel along at least one side thereof. The access door 198 may comprise a roll-up, sliding, hinged, or other door configuration with sufficient dimensions to enable an operator to access and dispose product units 124 into the channels 114 of the linear dispensing unit 102. The access door 198 may be dimensioned and/or configured to enable the linear dispensing unit 102 and/or the support structure 130 therefor to be removed or installed in the chamber, for example by rolling on wheels or casters on the support structure 130, for maintenance, loading, or the like.

The refrigeration unit 196 also includes one or more passageways 200 in walls thereof through which the track 142 of the conveyance system 104 passes. The passageways 200 are preferably provided with dimensions that are minimized such that the carriers 140 with the product unit 124 disposed thereon can pass through but that also minimizes an amount of loss of chilled air or thermal transfer through the passageway 200. The passageways 200 may include one or more closures 202 such as a curtain, gate, door, or hatch through which the carriers 140 can pass. A curtain may include a number of hanging members or strips of fabric, plastic, or other material that are pushed out of the way by the carrier 140 as it passes through. A gate or other door configuration may employ one or more sensors that detect the presence of the carrier 140 nearby and cause the gate to be automatically opened or moved out of the path of the carrier 140. The controller may also automatically open the gate closure 202 using location data for the carrier 140 that is available from the conveyance system 104 as described herein.

The refrigeration unit 196 may be placed in-line with other linear dispensing units 102 in the system 100 or an additional track segment 204 may be provided. In some embodiments it is preferable to minimize traffic of the carriers 140 through the refrigeration unit 196 so as to reduce cooling loads and thermal losses therefrom. The track segment 204 can enter and exit the refrigeration unit 196 through a single passageway 200 along one side thereof or a continuous path in a first passageway 200 and out a second passageway 200 may be employed. The track segment 204 can comprise a single or multiple tracks 142 that enter and exit the refrigeration unit 196.

With additional reference now to FIGS. 17-22, the validation system 106 is described in accordance with an exemplary embodiment. The validation system 106 is configured to receive product units 124 that have been dispensed from respective ones of the channels 114, carried by respective carriers 140 on their V-blocks 154, and staged, ordered, or grouped by the controller in a sequence associated with orders for the products placed by consumers or other users.

As depicted in FIGS. 17-21, the validation system 106 may include an escapement 164 onto which the product unit 124 may be released from the V-block 154 of the carrier 140. The escapement 164 is configured similarly to the V-block 154 to include a base panel 166 and a side panel 168 that are joined along a common edge and that are oriented substantially similarly to the orientation of the base plate 156 and the side plate 158 of the V-block 154, i.e. the base panel 166 and the side panel 168 are angled downward and to the side.

The escapement 164 is positioned vertically lower than the V-block 154 and with an upper edge of the escapement 164 in close proximity to the V-block 154 such that upon pivoting of the product stop 162, the product unit 124 can slide via gravity from the V-block 154 onto the escapement 164. The dimensions of the product stop 162 and the positioning of the escapement 164 relative to the V-block 154 are preferably configured to enable the product stop 162 to substantially close a gap therebetween and/or to partially overlap a top edge of the base panel 166 when the product stop 162 is pivoted downward.

The escapement 164 also includes a stop plate 170 configured substantially similarly to the product stop 162. The stop plate 170 is disposed at a bottom edge of the base panel 166 of the escapement 164 and is pivotable between an upstanding position in which it obstructs travel of a product unit 124 and a lowered position in which the product unit 124 is allowed to slide off of the base panel 166 via gravity. An actuator (not shown) for the stop plate 170 may be disposed on the escapement 164 and/or in close proximity thereto, unlike the carrier 140 which preferably does not include an actuator for the product stop 162 mounted thereon.

The configuration of the escapement 164 continues to maintain the orientation of the product unit 124 in substantially the same orientation as on the V-block 154 and in the channels 114. This configuration of the escapement 164 may be employed for any product units 124 whether they are flats, rounds, or irregular shapes. The downward and sideways tilt of the escapement 164 aids to automatically position product units 124 of any configuration into abutment with both the stop plate 170 and the side panel 168. In some embodiments, alternative escapement configurations may be employed to accommodate product units 124 of round or irregular shapes, such as an alternative escapement 164' depicted in FIG. 22, however such is typically not necessary as the escapement 164 can accommodate most product shapes. As such, assuming the product unit 124 was properly loaded into the channel 114, positions and/or locations of identifying indicia on the product unit 124 are known and easily identifiable by the controller.

The escapement 164 includes a plurality of sensors 172 disposed to about the escapement 164. The sensors 172 may comprise cameras, infrared scanners, ultraviolet scanners, or the like configured to capture images of the product unit 124 and/or to read identifying indicia such as writing, bar codes, QR codes, holographic indicia or the like printed or affixed on the product unit 124. Each of the sensors 172 may be positioned to view the product unit 124 from a respective direction. As such, flats, rounds, and irregular products can all be handled and scanned on the escapement 164. For example, each side or face of a product unit 124 having a cuboidal or "flat" configuration can be viewed by the sensors 172 while a "round" or cylindrical product unit 124 can also be adequately viewed from a plurality of directions by the sensors 172 to read the identifying indicia. The base panel 166 and the side panel 168 of the escapement 164 may be formed from a transparent material, such as a glass to enable the sensors 172 to capture images of the product unit 124 therethrough.

The validation system 106 includes a labeling module 174 (see FIG. 27) configured to print and apply a label 176 on validated product units 124. Preservation of the orientation of the product unit 124 and automatic abutment thereof against both the side panel 168 and the stop plate 170 aids placement and/or positioning of labels 176 on the product unit 124 because the product unit 124 is always placed in the same position relative to the label applicator (not shown). As such, the label applicator and/or the product unit 124 need not be repositioned and the positions thereof need not be verified prior to application of each label 176—the positions should be substantially constant. For example, in one embodiment the label applicator may be configured to always apply a label 176 at a location such that edges of the label 176 are approximately one quarter inch inward from the side panel 168 and one-half inch upward from the stop plate 170.

Although not shown in detail, the labeling module 174 includes a printer component, a label apparatus, and a label management unit. The printer component includes a printer device that prints information, such as product information, directions for use of product, manufacturer identification and patient information, onto the label 176. The label apparatus stores label stock and is linked with the printer component and the label management unit to feed, upon demand from the label management unit, the label stock to the printer component for printing. The label apparatus also applies the printed label 176 to the product unit 124.

The label apparatus further includes one or more roller guides and a peeler for peeling the label 176 from the label stock and applying the label 176 to the product unit 124. The label management unit, which may be incorporated into the controller of the dispensing system 100 or may be a separate control unit, determines when the label apparatus is needed and manages the outflow of label stock from the storage unit as well as instructs the printer component with the proper data for appropriate labeling of the product unit.

The label management unit may include a reader component in order to read informational indicia on the product unit that is necessary to configure the appropriate label 176 for the product unit. The reader component may be any suitable imaging device such as an optical reader, scanning device or camera. For example, the reader component reads an original manufacturer's name or barcode and transmits such information to the label management unit that may, in turn, provide such information to the controller for analysis. The controller may include a memory unit for storing programs and a processor to execute programmed instructions in response to the information from the label management unit and provide one or more instructions to the label management unit for application of the label 176 to the product unit 124.

As mentioned above, the controller has access to one or more databases that are populated with label information for printing on the label 176. The label information can include patient information, directions, drug reactions, name and location of dispensing entity, etc. The controller matches manufacturing information, read from the product unit, with the identity of the patient in need of a dispensed product. The controller then sends the label information and the patient's ID information to the label management unit. The label management unit instructs the printer component to print the supplied information onto the label stock and instructs the storage unit to feed additional label stock.

The reader component may also include a scanning feature to scan and capture an image of the product before and after the printed label 176 is placed on the inventory product. The images are transmitted to the controller for verification processing and/or storage. In the verification processing, the controller obtains the information printed on the label 176 and the manufacturer's information on the product unit 124 from the scanned image. The information is cross checked by the controller with original information in the database to ensure accuracy. If the controller determines a discrepancy between the printed label 176 and the information stored in the database, the controller may send an alert message to a user-interface to alert an operator of the system 100. In another embodiment, the controller may provide the alert over a network to a remotely located operator.

Figure 28:
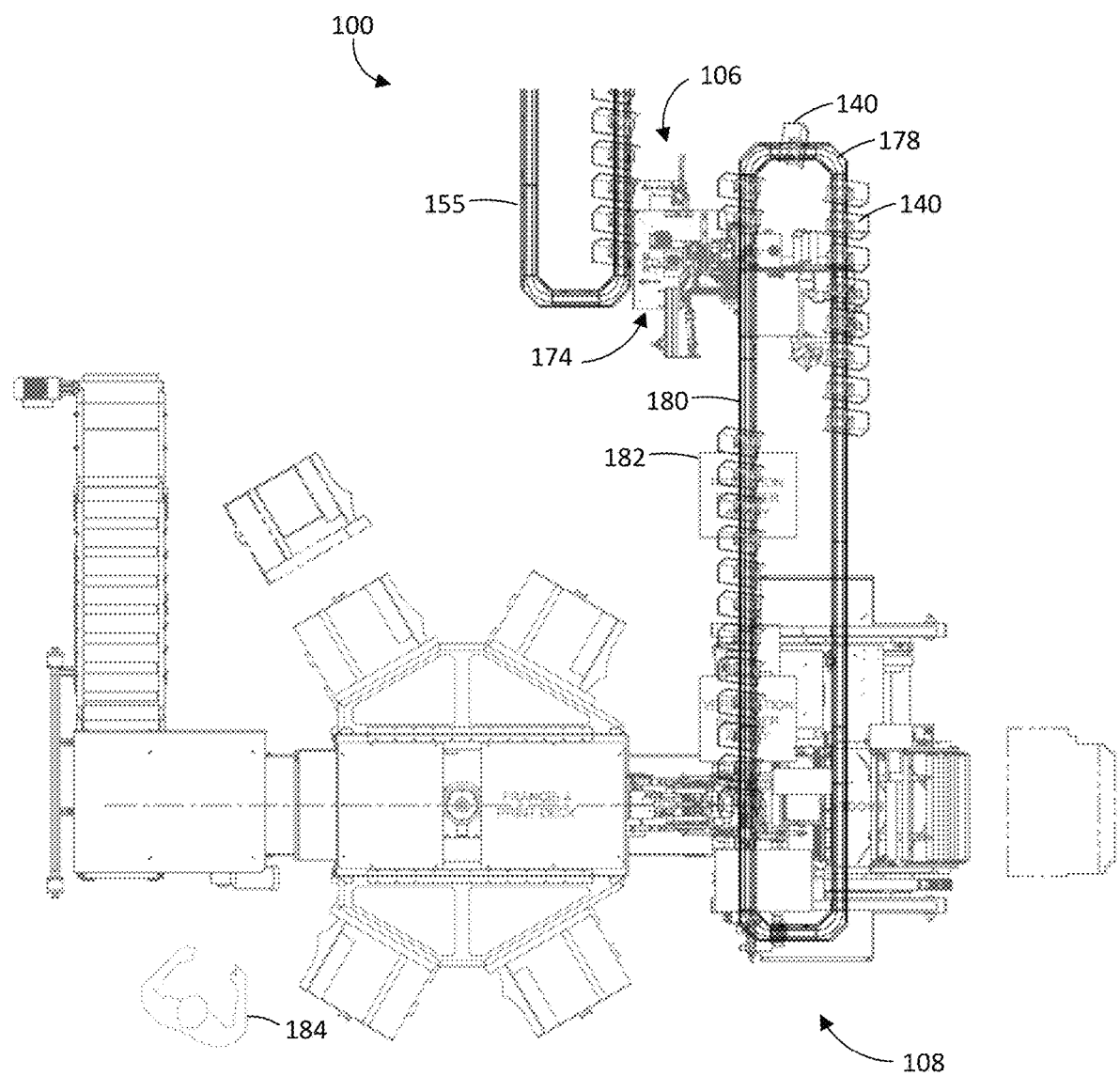
FIG. 28 is an enlarged view of an automated packaging component of the linear dispensing system of FIG. 23.
Figure 29:
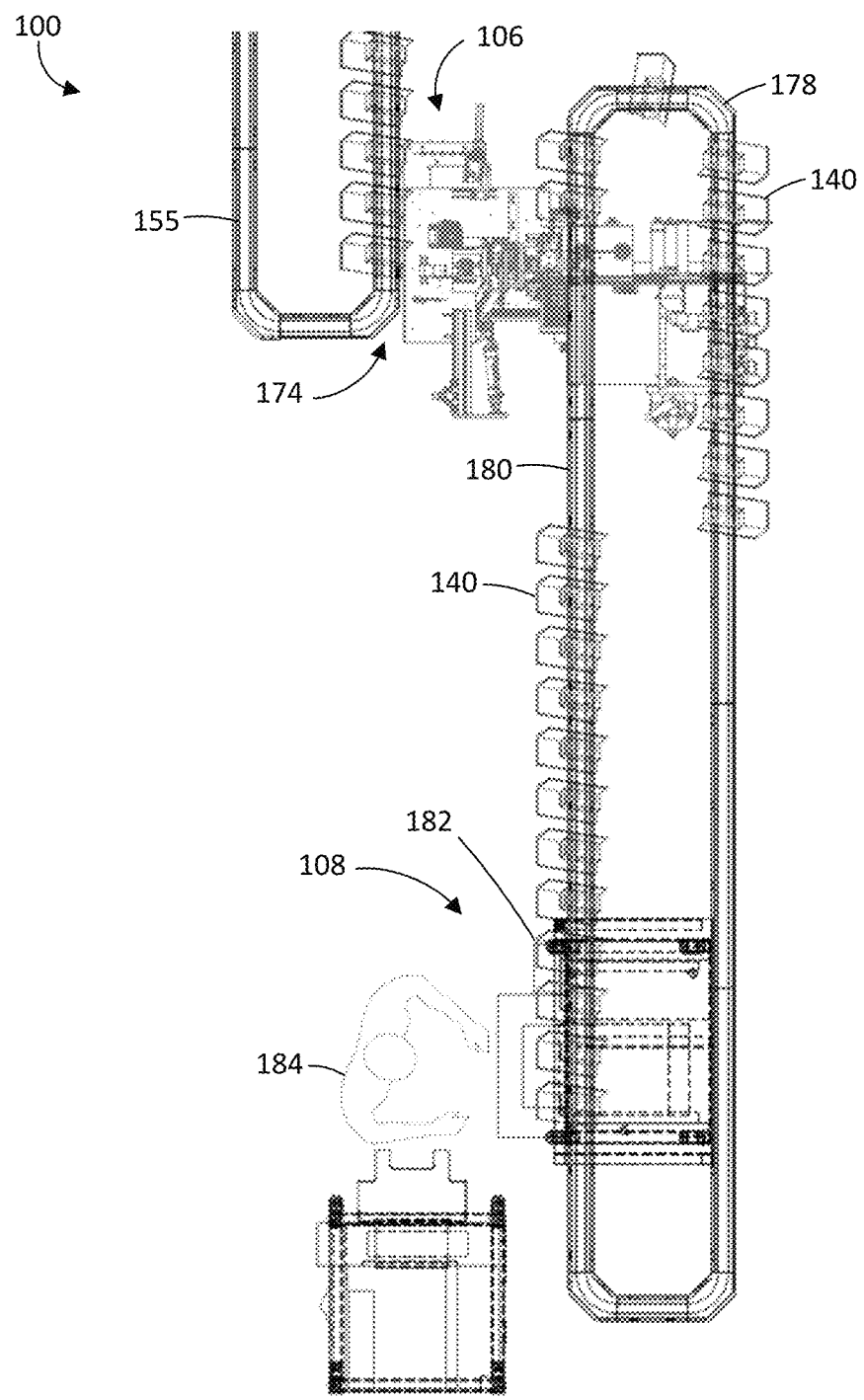
FIG. 29 is an enlarged view of a semi-automated packaging component of the linear dispensing system of FIG. 23.

Referring again to FIG. 23 and more particularly to FIGS. 28 and 29, the validation system 106 may transfer the validated and labeled product units 124 to a second conveyance system 178 that may be operated by the same or different controller(s) as the remainder of the system 100. The second conveyance system 178 is preferably configured similarly to the conveyance system 104 to include carriers 140 having the V-blocks 154 and to continue to preserve the orientation of the product units 124. The second conveyance system 178 transports the product units 124 from the labeling module 174 of the validation system 106 to the packaging system 108.

The packaging system 108 may employ an automated system like that depicted in FIG. 28 or a manual system like that depicted in FIG. 29. The automated system of FIG. 28 includes an induction scanner that scans the product units 124 to identify a first product unit 124 of an order. Identification of the first product unit 124 initiates printing of patient documents associated with the order, the product units dispensed for the order and/or any other information necessary or desired to be provided to the patient. The carriers 140 accumulate along the track 180 of the second conveyance system 178 and the product units 124 carried thereon are verified by a verification scanner 182 against the order to ensure all ordered items are present. The product units 124 are deposited into a bag, box, carton, or similar container suitable for shipment, the printed patient documents are inserted into the container, a shipping label is applied, and the container is sealed for shipping. The sealed container may then be transported to a bin or other location for shipping.

The manual system of FIG. 29 may similarly include an induction scanner which initiates printing of patient documents as well as a verification scanner that scans the product units 124 to ensure all items of an order are present. The product units 124 may then be automatically deposited in a shipping container while an operator 184 manually retrieves, scans, and inserts the patient documents into the shipping container. The container can be automatically or manually sealed and manually transported to a desired location for shipping. It is to be understood, that one or more of these steps may be completed manually or automatically depending on components provided without departing from the scope of exemplary embodiments described herein. However, in applications involving pharmaceuticals such as those described herein, automated handling of the product units 124 along with validation and verification of the product units 124 provided for an order may eliminate a need for a licensed pharmacist to verify the contents prior to shipping.

With continued reference to FIGS. 1-23, operation of the product dispensing system 100 for dispensing a product unit 124 from the linear dispensing unit 102 is described in accordance with an exemplary embodiment. One or more of the channels 114 of the linear dispensing units 102 are filled with respective products. The product units 124 of a particular product are placed or stacked in a respective channel 114 in a predetermined orientation that directs identifying indicia on each of the product units 124 in the same direction. The conveyance system 104 is also programmed to identify locations along the track 142 at which the carriers 140 are in alignment with each of the channels 114 and the identity of the product contained in each of the channels 114. In some embodiments, the location of only a first of the channels 114 need be registered and the controller can extrapolate the locations of one or more other channels 114 based on that location. In another embodiment, the width of one or more of the channels 114 is adjusted to accommodate a product unit 124 of a greater or lesser width dimension and the location of the adjacent channels 114 must then be registered with the controller or can be extrapolated by the controller. In yet another embodiment, the mounting plates 128 enable adjustment of the width of the channels 114 but also maintain a constant side-to-side spacing or location of each of the channels 114 such that adjustment of the width of one channel 114 does not affect a track location of adjacent channels 114.

Following initial setup and configuration, an order is received for one or more product units 124. The controller assigns a carrier 140 to each of the required product units 124 and controls their movement to the channels 114 containing those product units 124. For each required product unit 124, a carrier 140 arrives at the respective channel 114 and assumes a track location that places the base plate 156 and the side plate 158 of the V-block 154 in substantial alignment with the side wall 116 and the bottom wall 120 of the channel 114. The ejector 122 activates the belt 136 to feed or enable sliding movement of the product unit 124 from the exit pathway 129 of the channel 114 onto the base plate 156 of the V-block 154. The product-dispensed sensor 139d senses the passage of the product unit 124 onto the V-block 154 and the product unit 124 continues sliding movement along the V-block 154 until reaching and abutting the product stop 162 as well as the side plate 158.

The ejector 122 continues movement of the belt 136 to move a product unit 124 located at the base of the channel 114 outward from beneath the stack of product units 124 and along the exit pathway 129 to a distal end thereof. The product-ready sensor 139c detects the product unit 124 at the distal end of the exit pathway 129 and the striker-home sensor 139e detects the presence of a striker 138 on the belt 136 which instructs the ejector 122 to cease movement of the belt 136. The controller may determine whether sufficient inventory of the product remains in the channel 114 via signals received from the low-inventory sensor 139a and the channel-empty sensors 139b. One or more signals or alerts may be provided to an operator 183 when replenishment of product units 124 is needed.

The dispensed product unit 124 is moved by the controller via the conveyance system to an exit path 155 and/or to a staging loop 157 to await arrival of carriers 140 containing additional product units 124 associated with the order. Upon arrival of such additional carriers 140, the carriers 140 may be aggregated and then moved as a group or sequentially to the validation system 106.

Figure 20:
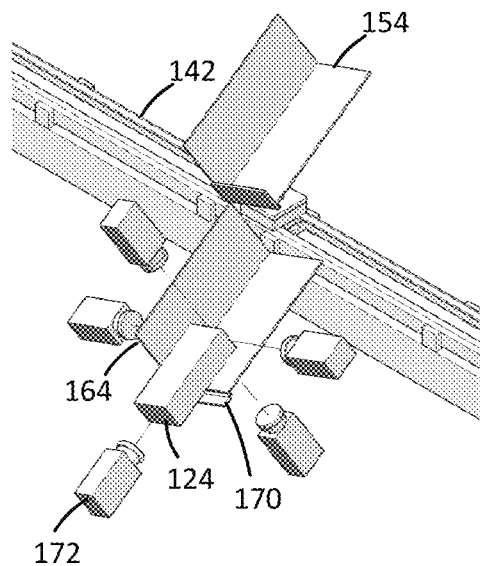
Figure 22:
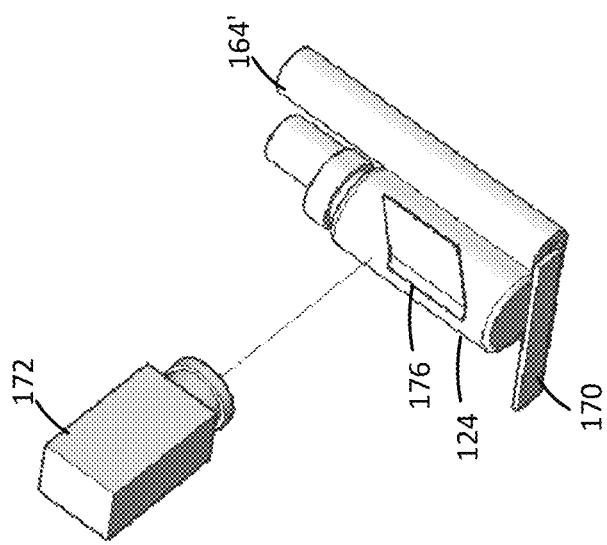
FIG. 22 is a perspective view of a sensor disposed to detect and/or read identifying indicia on a cylindrical product disposed on another escapement depicted in accordance with an exemplary embodiment.
Figure 21:
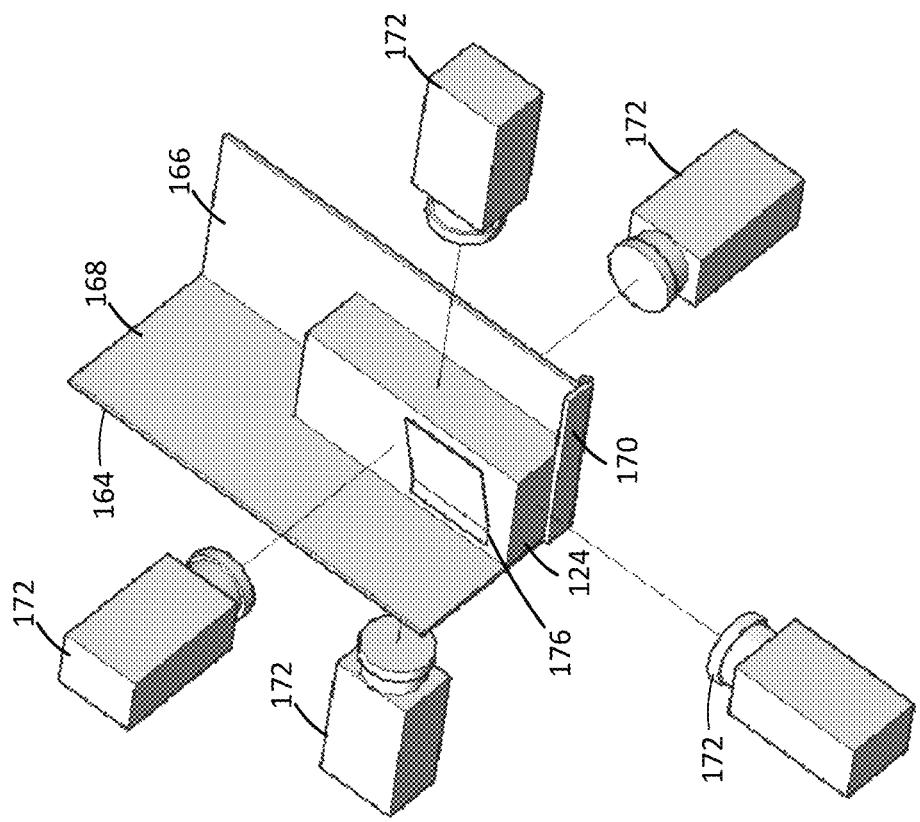
FIG. 21 is a perspective view of a plurality of sensors disposed to detect and/or read identifying indicia on a product disposed on an escapement depicted in accordance with an exemplary embodiment.

At the validation system 106 each of the carriers 140 is aligned, in turn, with the escapement 164 and the actuator associated with the escapement 164 actuated to pivot the product stop 162 and to allow the product unit 124 to slide via gravity onto the escapement 164 and into abutment with both the side panel 168 and the stop plate 170 thereon, as depicted in FIGS. 16-20. Transfer of the product unit 124 to the escapement 164 preserves the orientation of the product unit 124. The sensors 172 are operated to capture images of the product unit 124 and/or to read identifying indicia thereon to validate that the correct product unit 124 has been dispensed for the order. As depicted in FIG. 21, a label 176 is applied to the product unit 124 and one or more images may be captured of the product unit 124 with the label 176 disposed thereon. The images of the product unit 124 with and without the label 176 may be transmitted and stored in a memory to maintain a record of the dispensing of the product unit 124. As shown in FIG. 20, the stop plate 170 of the escapement 164 may be actuated to allow the labeled product unit 124 to pass by gravity and/or with the aid of additional components to the second conveyance system 178 and onto a carrier 140 associated therewith while continuing to maintain orientation of the product unit 124.

Figure 27:
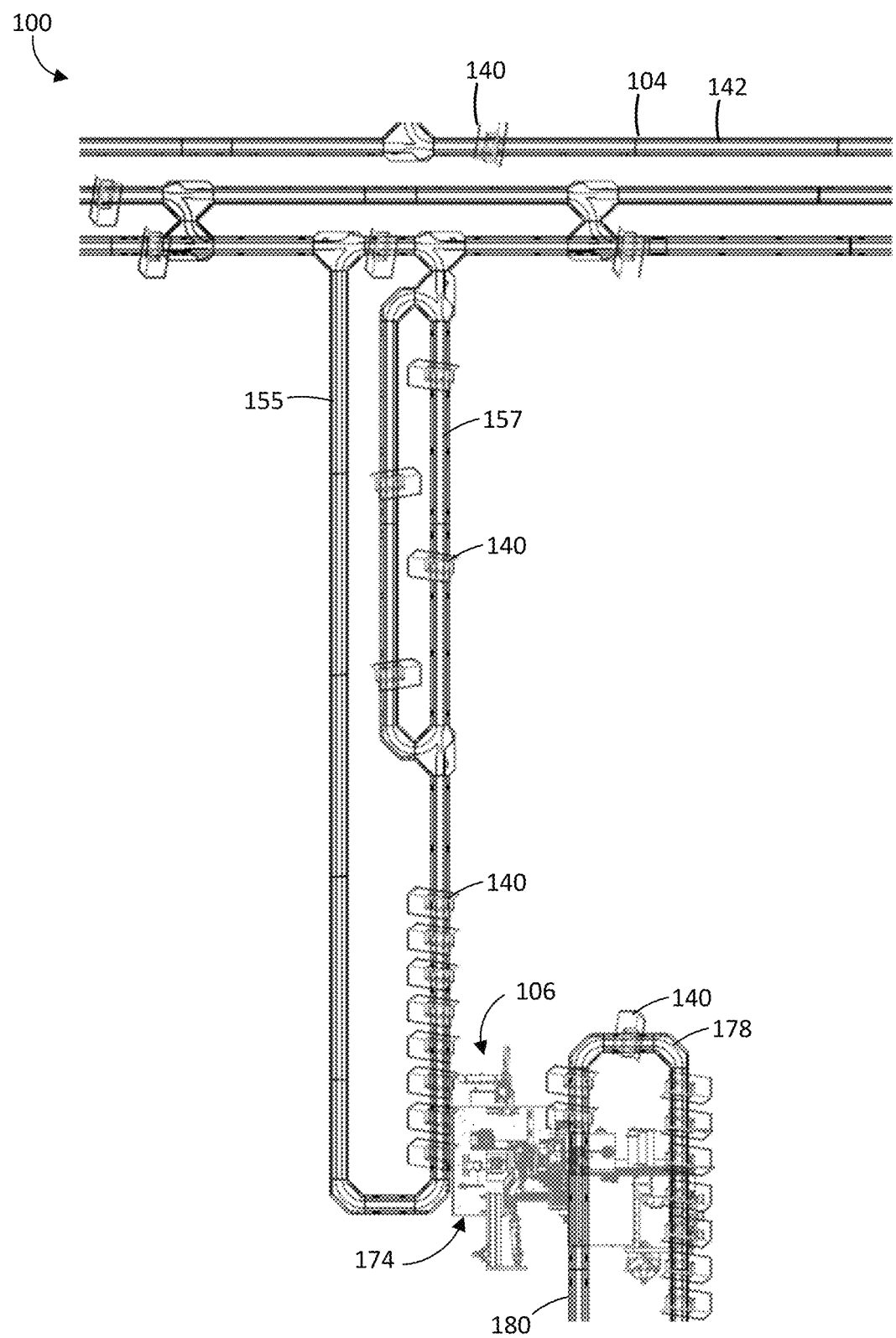
FIG. 27 is an enlarged view of labeling component of the linear dispensing system of FIG. 23.

With reference to FIGS. 27-29, the second conveyance system 178 moves the labeled product units 124 to the packaging system 108 where their presence triggers printing of informational documents to be included in the shipping container. The product units 124 are verified with the order to ensure complete and correct fulfillment of the order and the product units 124 and informational documents are disposed in a shipping container which is labeled for shipping and then sealed.

Figure 25:
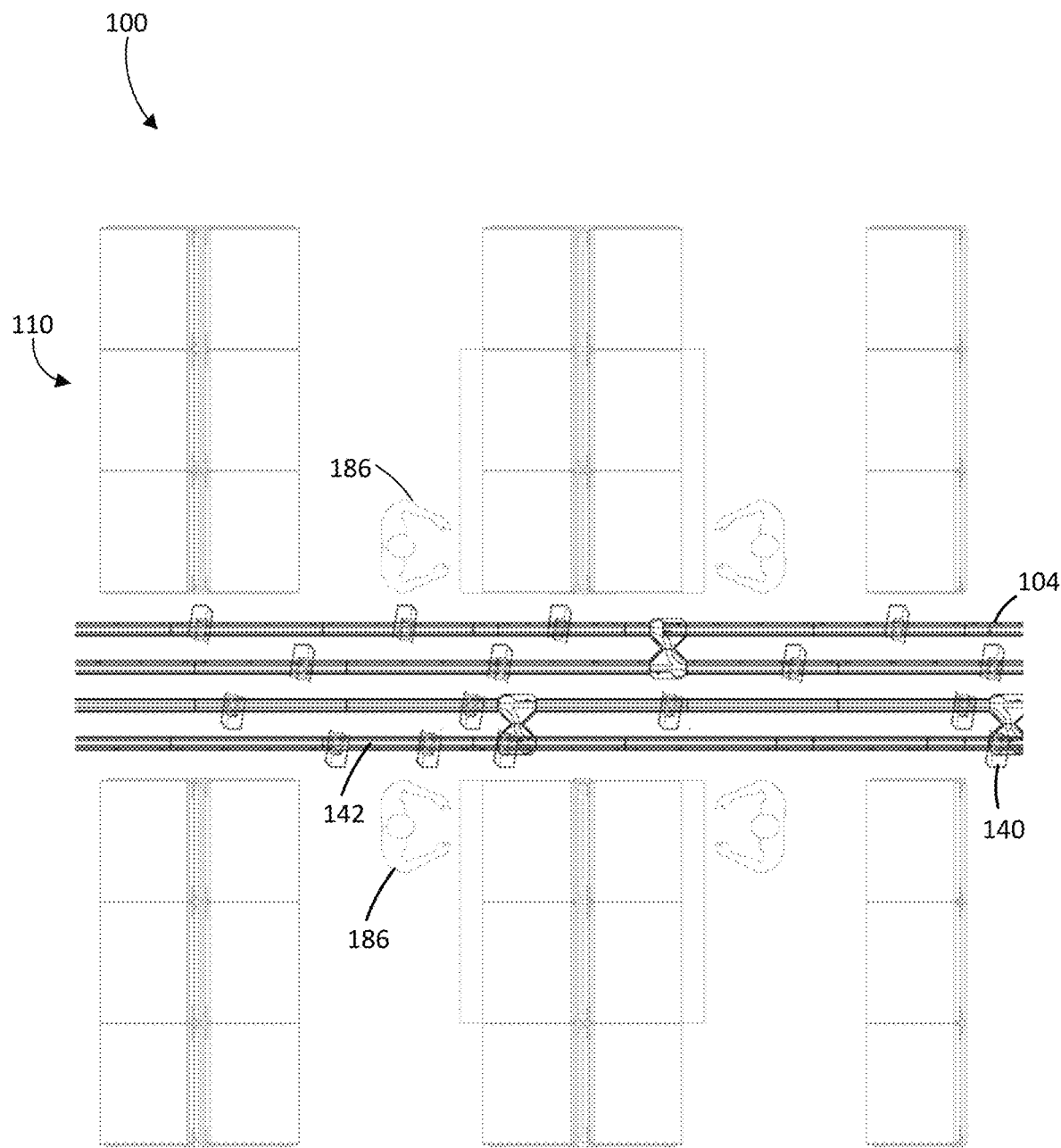
FIG. 25 is an enlarged view of a manual unit-of-use dispensing component of the linear dispensing system of FIG. 23.
Figure 26:
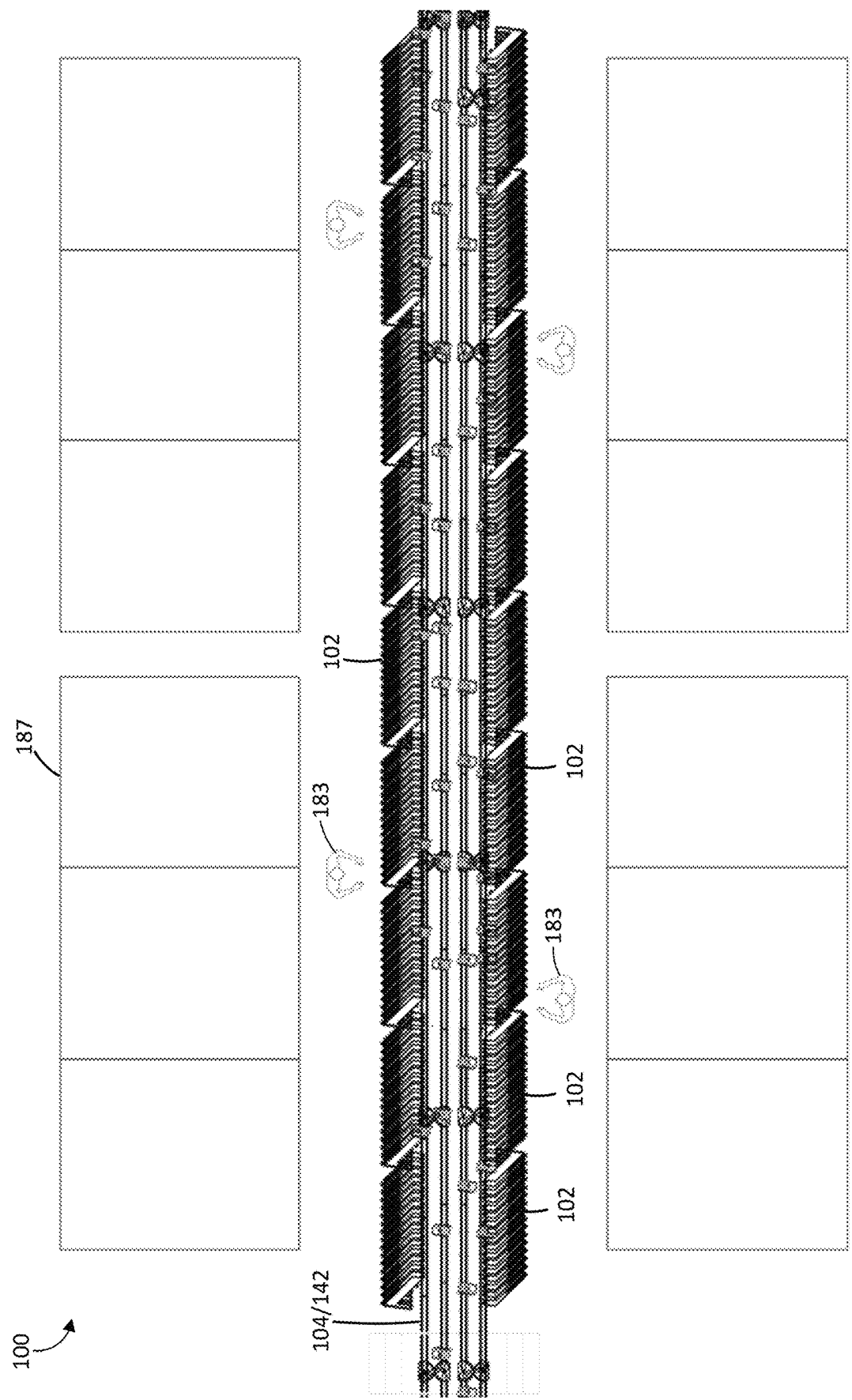
FIG. 26 is an enlarged view of an automated dispensing component of the linear dispensing system of FIG. 23.

With reference now to FIGS. 23, 25, and 26, in some embodiments the product dispensing system 100 may include one or more manual product placement stations 110 where unit-of-use product units 124 may be retrieved and placed on the carriers 140 manually by one or more operators 184. Such manual placement stations 110 may be employed for products that are ordered less often than products dispensed by the linear dispensing units 102. For example, a product that is ordered ten or one hundred times a day may be dispensed by the linear dispensing units 102, while a product that is ordered ten times a year might be dispensed manually.

Each operator 186 at the station 110 may be provided with a user interface and/or monitor that is in communication with the controller and that provides a display of ordered product units 124. The display may also indicate a location of the ordered product unit 124 within storage locations 187 available to the operator 186 as well as an image of the product among other information to aid the operator in quickly finding and retrieving the product. The controller provides a carrier 140 at a location along the track 142 of the conveyance system 104 at a location near the operator 186. The operator 186 may scan identifying indicia such as a barcode on the retrieved product unit 124 to verify the correct product unit has been retrieved. The operator 186 may also scan or input an identifying indicia associated with the carrier 140 such that the product unit identification and the carrier identification can be married to allow the controller to track their movements. The operator 186 places the product unit 124 onto the V-block 154 of the carrier 140 in a proper orientation, and the controller moves the carrier 140 on for treatment in an identical manner as product units 124 dispensed from the linear dispensing units 102.

Figure 24:
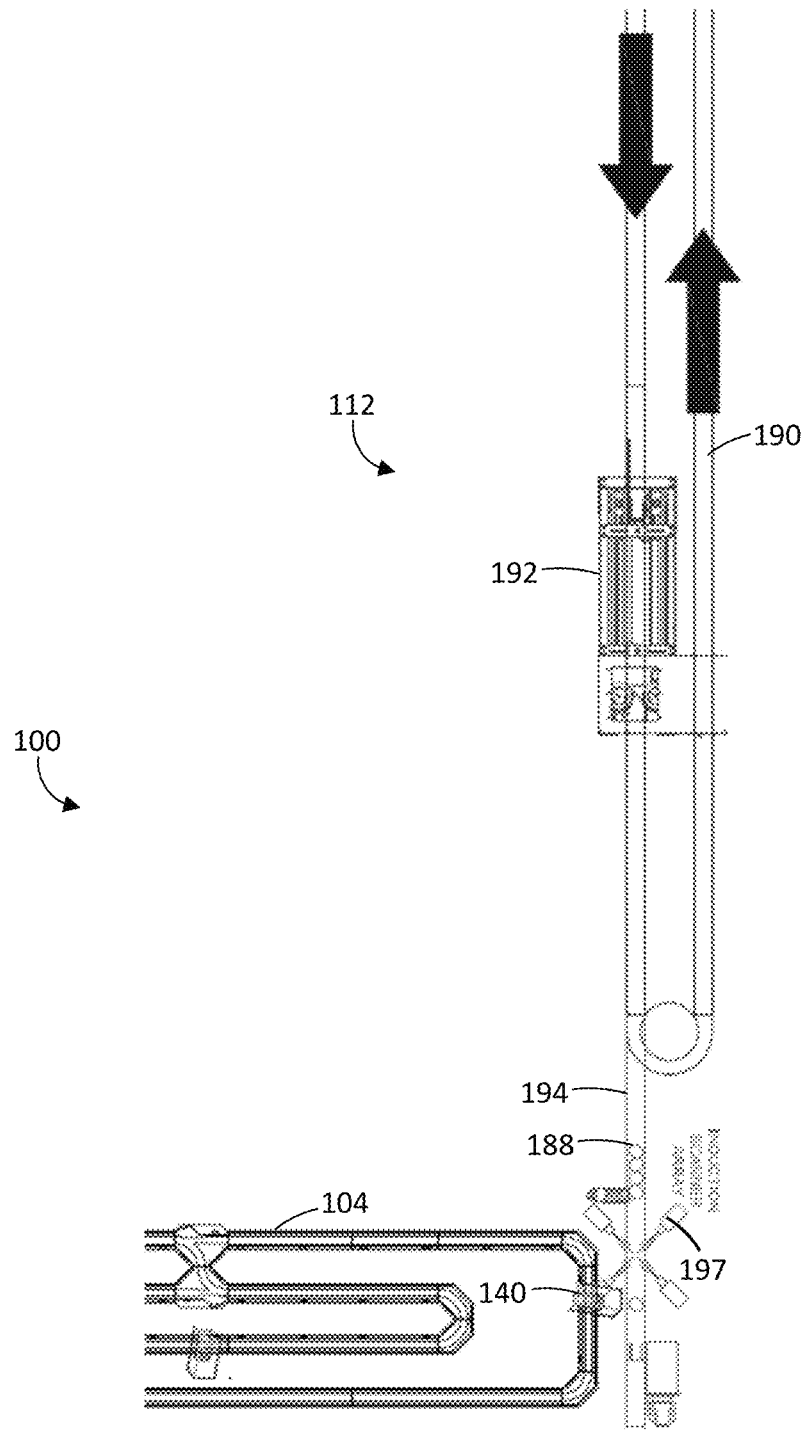
FIG. 24 is an enlarged view of an oral solids integration component of the linear dispensing system of FIG. 23.

As indicated previously, the product dispensing system 100 may also accommodate non-unit-of-use products (hereinafter non-UOU products) through a non-UOU induction system 112 as depicted in FIG. 24. Initially, upon receipt of an order for a non-UOU product an apparatus (not shown) or operator fills a vial 188 or other container with the desired product and amount thereof. The non-UOU product vial 188 is placed in a transport-puck which is carried by a conveyance system 190 to a de-pucking device 192 that removes the vial 188 from the transport-puck and places the vial 188 onto a vial conveyor 194. At a terminal end of the vial conveyor 194 a plurality of scanners 197 image and/or scan the vial 188 to verify its identification/contents. The vial 188 is then transferred automatically onto the V-block 154 of a carrier 140 that is positioned to receive the vial 188 and the identification of the vial 188 is married to the identification of the carrier 140 to enable tracking thereof by the controller. Similarly to the flats carried on the V-block 154 as described previously, the vial 188 is naturally held by gravity in abutment with the side plate 158 and the product stop 162 and can be transported and handled in the same manner as other product units 124 as described herein.

Exemplary embodiments of the product dispensing system 100 are thus adaptable to myriad needs of a particular application. The system 100 can be employed to automatically dispense flat, round, and irregularly shaped unit-of-use products from the linear dispensing units 102 and to validate, label, and package those products without operator intervention. The system 100 can employ manual product placement stations 110 to enable manual induction of product units 124 into the system 100 and to indiscriminately aggregate those product units 124 together with product units 124 from other sources. Non-UOU products may also be similarly inducted into the system 100 and aggregated with other product units 124.

The system 100 further simplifies handling and manipulation of the product units 124 by maintaining an orientation of the product units 124 from initial dispensing onto the carriers 140 to final disposition into a shipping container or other final receptacle. Accordingly, identifying indicia on the product units 124 is maintained in known locations and application of labels 176 on the product units 124 is greatly simplified. Additionally, provision of individual carriers 140 and marriage thereof to respective product units 124 placed thereon ensures and simplifies proper tracking, movement, and aggregation of the product units 124 within the system 100.

Figure 30:
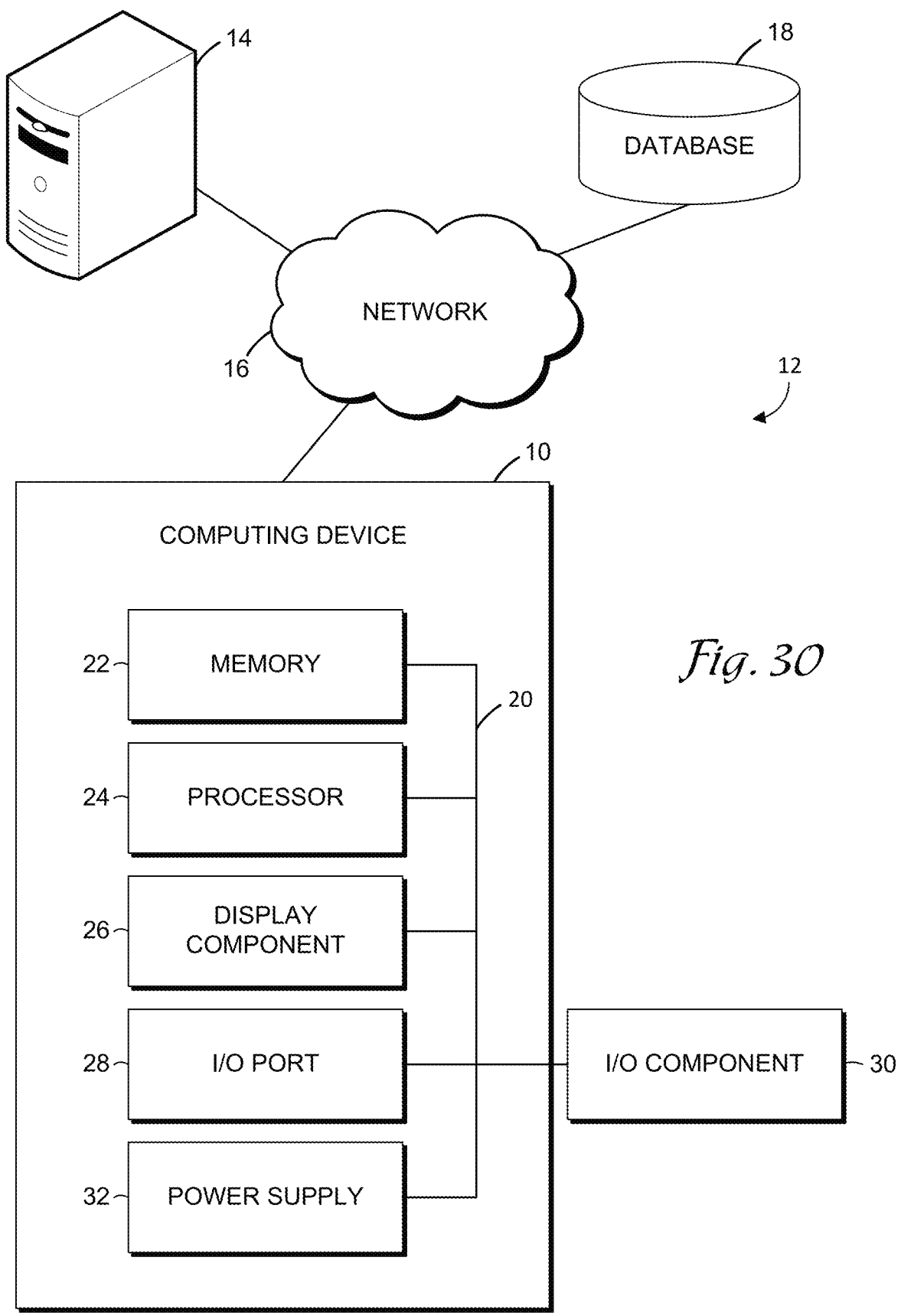
FIG. 30 is a diagram of a computing environment suitable for use in exemplary embodiments.

Exemplary embodiments may use, incorporate, and/or be embodied at least partially on one or more computing systems or devices such as the computing device 10 depicted in FIG. 30. The computing device 10 is but one example of a suitable computing device and is not intended to suggest any limitation as to the scope of use or functionality of exemplary embodiments. The computing device 10 should not be interpreted as having any dependency or requirement relating to any one or combination of components illustrated. The computing device 10 is depicted within an exemplary operating environment 12 in which the computing device 10 may be disposed in a networked configuration. Although many components of the operating environment 12 and the computing device 10 are not shown or described herein, it is appreciated that such components and their interconnection are well known. Accordingly, additional details concerning the construction of the operating environment 12 and the computing device 10 are not further disclosed herein.

Exemplary embodiments may be practiced in a variety of system configurations, including hand-held devices, consumer electronics, general-purpose computers, specialty computing devices, and the like. The computing device 10 is inclusive of devices referred to as workstations, servers, desktops, laptops, hand-held device, and the like as all are contemplated within the scope of FIG. 1 and in references to the computing device 10.

Figure 1:
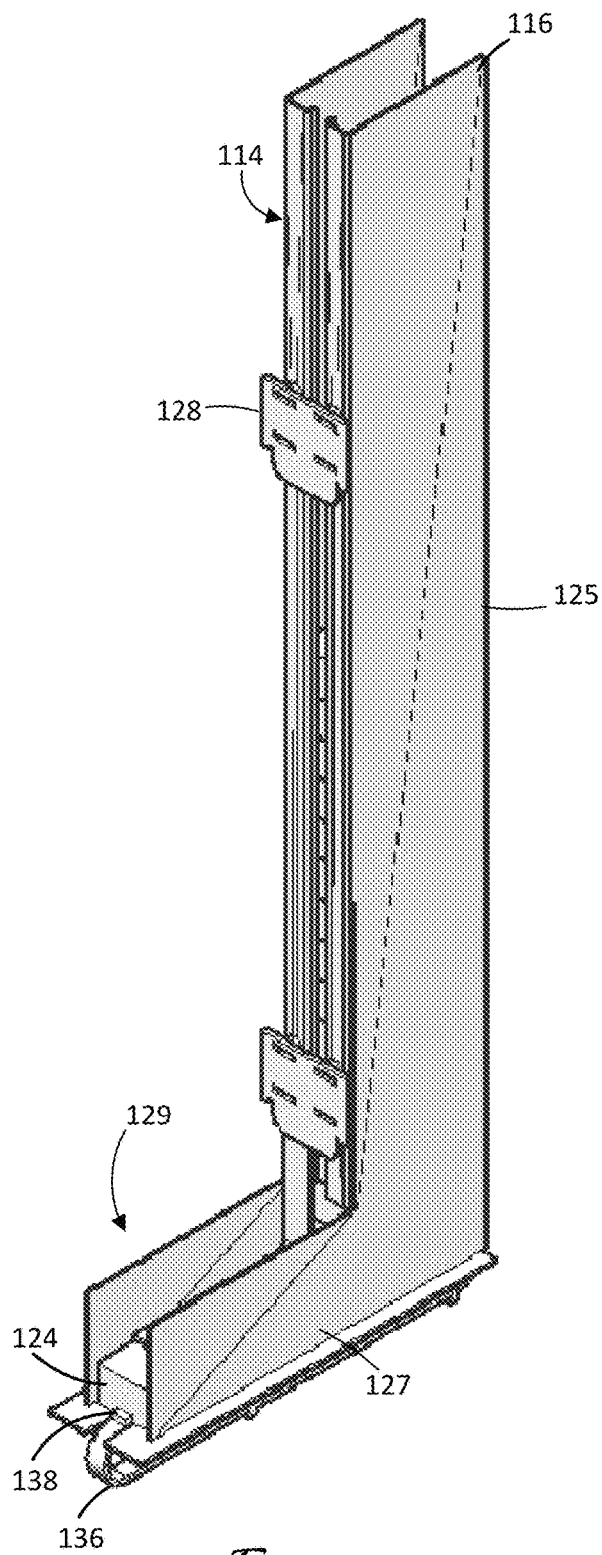
FIG. 1 is a perspective view of a single product channel of a linear dispensing unit depicted in accordance with an exemplary embodiment.
Figure 2:
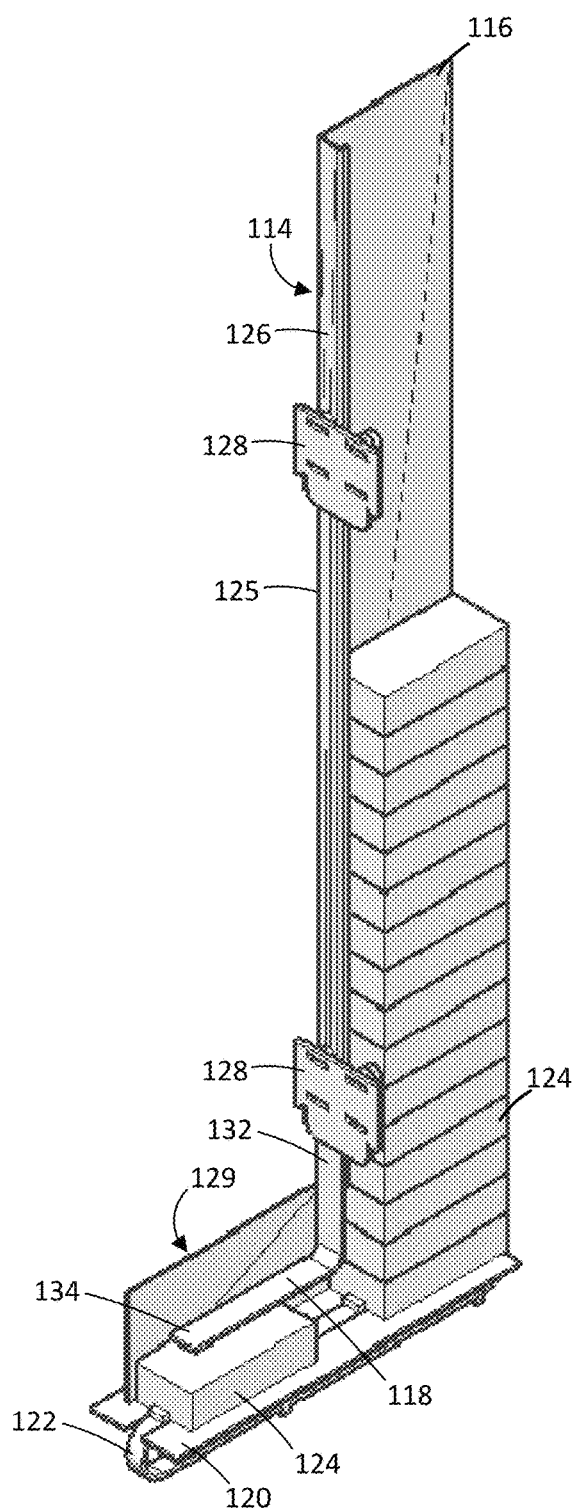
FIG. 2 is a perspective view of the channel of FIG. 1 with a side plate removed to reveal products disposed in the channel.
Figure 3:
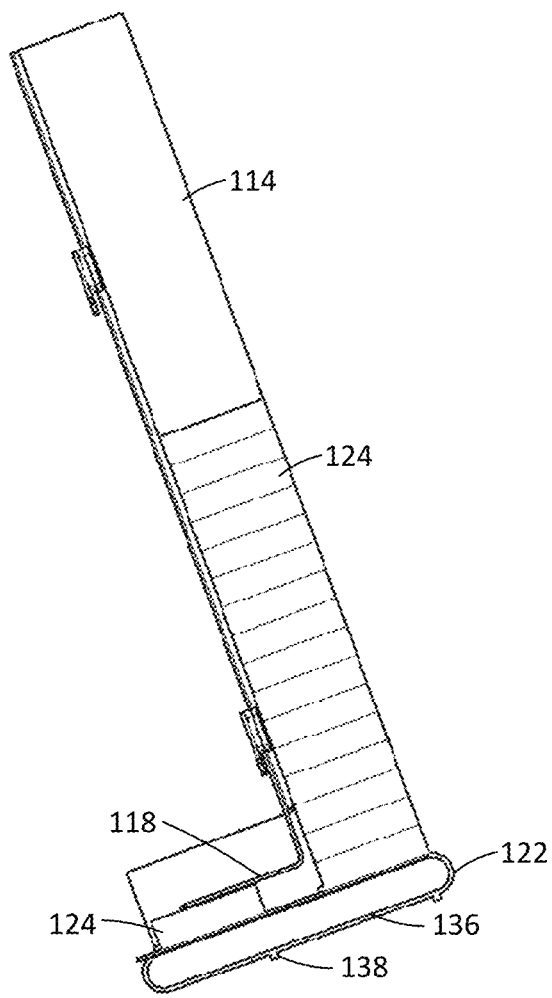
FIG. 3 is side elevational view of the channel of FIG. 1 depicted with a side plate removed and disposed on a forward-leaning angle in accordance with an exemplary embodiment.
Figure 4:
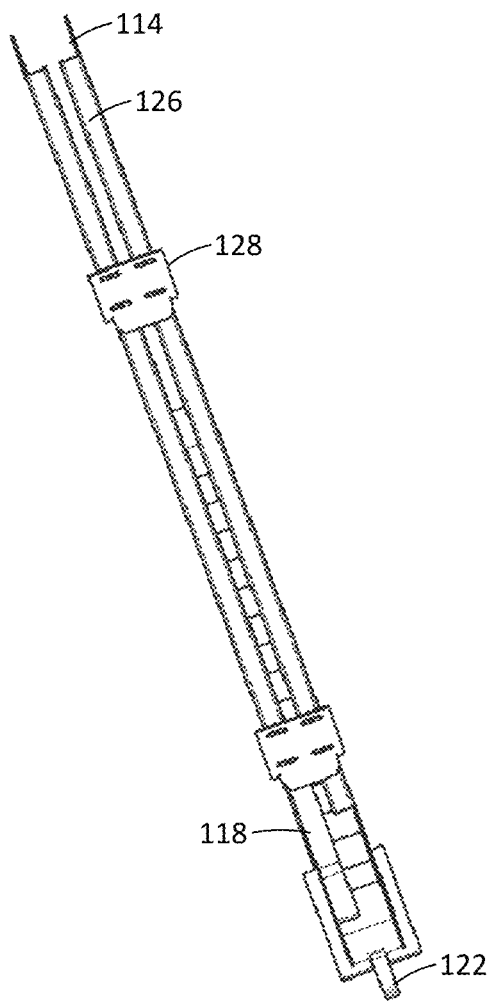
FIG. 4 is a forward-end elevational view of the channel of FIG. 3 disposed at a side-leaning angle in accordance with an exemplary embodiment.

Exemplary embodiments may be practiced by a stand-alone computing device as depicted in FIG. 1 and/or in distributed computing environments where one or more tasks are performed by remote-computing devices 14 that are linked through a communications network 16. The remote-computing devices 14 comprise one or more computing devices that may be configured like the computing device 10.

An exemplary computer network 16 may include, without limitation, local area networks (LANs) and/or wide area networks (WANs). Such networking environments are commonplace in offices, enterprise-wide computer networks, intranets and the Internet. When utilized in a WAN networking environment, the computing device 10 may include a modem or other means for establishing communications over a WAN, such as the Internet. In a networked environment, program modules or portions thereof may be stored in association with the computing device 10, a database 18, or one or more remote-computing devices 14. For example, and not limitation, various application programs may reside on memory associated with any one or more of the remote-computing devices 14. It will be appreciated that the network connections shown are exemplary and other means of establishing a communications link between the computers (e.g., the computing device 10 and the remote-computing devices 14) may be utilized.

Exemplary embodiments may be described in the general context of computer code or machine-useable instructions, including computer-executable instructions, such as program modules being executed by a computer or other machine, like a smartphone, tablet computer, or other device. Generally, program modules including routines, programs, objects, components, data structures, or the like, refers to code that performs particular tasks or implements particular data types.

With continued reference to FIG. 30, the computing device 10 includes one or more system busses 20, such as an address bus, a peripheral bus, a local bus, a data bus, or the like, that directly or indirectly couple components of the computing device 10. The bus 20 may comprise, for example, an Industry Standard Architecture (ISA) bus, Micro Channel Architecture (MCA) bus, Enhanced ISA (EISA) bus, Video Electronic Standards Association (VESA) local bus, a Peripheral Component Interconnect (PCI) bus, among other bus architectures available in the art.

The bus 20 couples components like internal memories 22, processors 24, display components 26, input/output (I/O) ports 28 and I/O components 30 coupled thereto, and a power supply 32. Such components may be provided singly, in multiples, or not at all as desired in a particular configuration of the computing device 10. As indicated previously, additional components might also be included in the computing device 10 but are not shown or described herein so as not to obscure exemplary embodiments. Such components are understood as being within the scope of embodiments described herein.

The memory 22 of the computing device 10 typically comprises a variety of non-transitory computer-readable media in the form of volatile and/or nonvolatile memory that may be removable, non-removable, or a combination thereof. Computer-readable media include computer-storage media and computer-storage devices and are mutually exclusive of communication media, e.g. carrier waves, signals, and the like. By way of example, and not limitation, computer-readable media may comprise Random Access Memory (RAM); Read-Only Memory (ROM); Electronically Erasable Programmable Read-Only Memory (EEPROM); flash memory or other memory technologies; compact disc read-only memory (CDROM), digital versatile disks (DVD) or other optical or holographic media; magnetic cassettes, magnetic tape, magnetic disk storage or other magnetic storage devices, or any other medium that can be used to encode desired information and be accessed by the computing device 10.

The processor 24 reads data from various entities such as the memory 22 or the I/O components 30 and carries out instructions embodied thereon or provided thereby.

The display component 26 presents data indications to a user or other device. Exemplary presentation components include a display device, a monitor, a speaker, a printing component, a vibrating component, or other component that produces an output that is recognizable by a user.

The I/O ports 28 allow the computing device 10 to be logically coupled to other devices including the I/O components 30, some of which may be built in. Illustrative components include a microphone, joystick, game pad, satellite dish, scanner, printer, or wireless device, among others.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A product dispensing system comprising:
    a linear dispensing unit having a plurality of channels configured to receive product units in a stacked arrangement, and having an exit pathway along which a product unit can be transferred, the exit pathway including an ejector that controls movement of the product unit along the exit pathway; and
    a conveyance system that includes a plurality of carriers disposed on a track and propelled therealong via a linear propulsion system, each of the carriers being uniquely identifiable, independently moveable along the track, and including a V-block disposed thereon, the V-block having a sidewall and a base plate joined along a common edge generally orthogonally to one another, the V-block being oriented to provide a downward and one of an upstream or a downstream slope to the base plate that promotes movement by gravity of the product unit disposed on the V-block into contact with the sidewall and a product stop disposed at a distal edge of the base plate.

2. The product dispensing system of claim 1, wherein a first carrier of the plurality of carriers carries the product unit dispensed from the linear dispensing unit and a second carrier of the plurality of carriers carries a second product unit that is manually disposed on the V-block of the second carrier by an operator.

3. The product dispensing system of claim 1, wherein a first carrier of the plurality of carriers carries the product unit dispensed from the linear dispensing unit, the product unit comprising a unit-of-use product unit, and a second carrier of the plurality of carriers carries a second product unit, the second product unit comprising a non-unit-of-use product unit.

4. The product dispensing system of claim 1, wherein the linear propulsion system uses a plurality of electromagnets to propel the carriers.

5. The product dispensing system of claim 1, wherein product stop is pivotably coupled to the V-block at the distal edge of the base plate.

6. The product dispensing system of claim 5, wherein the product stop is pivotable by an actuator mounted disparately to the V-block.

7. The product dispensing system of claim 5, wherein the product stop is biased toward a position in which the product stop obstructs movement of the product unit off of the base plate of the V-block by gravity.

8. The product dispensing system of claim 1, further comprising:
    a validation system that includes an escapement, the escapement maintaining an orientation of the product unit, the validation system including at least one sensor that detects identifying indicia on the product unit disposed on the escapement.

9. The product dispensing system of claim 8, wherein the product unit is transferred from the V-block to the escapement via gravity.

10. The product dispensing system of claim 8, wherein the validation system includes a labeling device that applies a label to the product unit.

11. The product dispensing system of claim 1, further comprising:
    a controller in electrical communication with the linear dispensing unit and the conveyance system, the controller verifying an identity of the product unit, an association of the product unit with an order, and an association of the product unit with data elements printed on a label that is affixed to the product unit.

12. The product dispensing system of claim 11, wherein the controller stages one or more of the plurality of carriers along the conveyance system to aggregate product units carried thereby with respect to the order for packaging.

13. A product carrier for a product dispensing system, the product carrier comprising:
    a V-block having a sidewall and a base plate joined along a common edge generally orthogonally to one another, the base plate being oriented to provide a downward and one of an upstream or a downstream slope relative to a direction of movement of the V-block along a conveyance system, the upstream or downstream slope promoting movement by gravity of a product unit disposed on the base plate into contact with the sidewall and a product stop disposed at a distal edge of the base plate.

14. The product carrier of claim 13, wherein the V-block is coupled to a puck configured to engage and travel along on a track and that is propelled therealong via a linear propulsion system, each of the pucks being uniquely identifiable and independently moveable along the track.

15. The product carrier of claim 13, wherein product stop is pivotably coupled to the V-block at the distal edge of the base plate.

16. The product carrier of claim 15, wherein the product stop is pivoted by an actuator mounted disparately to the V-block.

17. The product carrier of claim 16, wherein the product stop is biased toward a position on which the product stop obstructs movement of the product unit off of the base plate of the V-block by gravity.

18. A method for filling an order for a unit-of-use product, the method comprising:
    transferring a product unit from a linear dispensing unit onto a conveyance system, the linear dispensing unit having a plurality of upstanding channels configured to receive a plurality of product units in stacked arrangements and each channel having an exit pathway along which the respective product units are transferred to the conveyance system, the exit pathway including an ejector that controls movement of the product unit along the exit pathway;
    receiving, by the conveyance system, the product unit on a V-block, the V-block being moveable along the conveyance system by a linear propulsion system and including a sidewall and a base plate that are joined along a common edge generally orthogonally to one another, the V-block being oriented to provide a downward and one of an upstream or a downstream slope to the base plate that promotes movement by gravity of the product unit disposed on the V-block into contact with the sidewall and a product stop disposed at a distal edge of the base plate;
    moving the V-block along the conveyance system to a validation system that includes an escapement, the escapement maintaining an orientation of the product unit; and
    validating the identity of the product unit using a sensor that detects identifying indicia on the product unit disposed on the escapement.

19. The method of claim 18, wherein an order includes a plurality of products units, each product unit being disposed on a respective V-block, and further comprising:

aggregating each of the respective V-blocks of the plurality of product units together along the conveyance system.

20. The method of claim 19, wherein the plurality of product units includes mechanically dispensed product units that are transferred from the linear dispensing unit and manually dispensed product units that are disposed on respective V-blocks by an operator, and wherein aggregating each of the respective V-blocks further comprises:
  aggregating the V-blocks carrying the mechanically dispensed product units and the manually dispensed product units together.

* * * * *